US008660949B2

(12) United States Patent
Li et al.

(10) Patent No.: US 8,660,949 B2
(45) Date of Patent: Feb. 25, 2014

(54) METHOD AND SYSTEM FOR WORKING CAPITAL MANAGEMENT

(75) Inventors: Wen-Syan Li, Fremont, CA (US); Yu Cheng, Shanghai (CN)

(73) Assignee: SAP AG, Walldorf (DE)

( * ) Notice: Subject to any disclaimer, the term of this patent is extended or adjusted under 35 U.S.C. 154(b) by 78 days.

(21) Appl. No.: 13/353,105

(22) Filed: Jan. 18, 2012

(65) Prior Publication Data

US 2013/0066774 A1 Mar. 14, 2013

Related U.S. Application Data

(60) Provisional application No. 61/532,896, filed on Sep. 9, 2011.

(51) Int. Cl.
*G06Q 40/00* (2012.01)

(52) U.S. Cl.
USPC .............................. 705/40; 705/39

(58) Field of Classification Search
USPC ....................................... 705/40, 39
See application file for complete search history.

(56) References Cited

U.S. PATENT DOCUMENTS

| | | | |
|---|---|---|---|
| 6,215,771 | B1 | 4/2001 | Turner et al. |
| 6,957,200 | B2 | 10/2005 | Buczak et al. |
| 7,593,905 | B2 | 9/2009 | He |
| 8,073,790 | B2 | 12/2011 | Soetjahja |
| 8,264,971 | B2 | 9/2012 | Alfano et al. |
| 8,301,776 | B2 | 10/2012 | Hebert et al. |
| 8,429,096 | B1 | 4/2013 | Soundararajan et al. |
| 2002/0023053 | A1* | 2/2002 | Szoc et al. ...................... 705/39 |
| 2003/0055614 | A1 | 3/2003 | Pelikan et al. |
| 2005/0097559 | A1 | 5/2005 | He |
| 2005/0177833 | A1 | 8/2005 | Sauermann |
| 2009/0319421 | A1* | 12/2009 | Mathis et al. .................. 705/40 |
| 2010/0023564 | A1 | 1/2010 | Yemeni et al. |
| 2010/0049637 | A1 | 2/2010 | Laventman et al. |
| 2010/0077449 | A1 | 3/2010 | Kwok et al. |
| 2010/0325281 | A1 | 12/2010 | Li et al. |

FOREIGN PATENT DOCUMENTS

| | | |
|---|---|---|
| EP | 2161902 A1 | 3/2010 |
| WO | 2008087162 A1 | 7/2008 |

OTHER PUBLICATIONS

Aulbach, et al, "Multi-tenant databases for software as a service: Schema-Mapping Techniques", Proceedings of the ACM SIGMOND Int'l Conference on Management of Data, 2008, 12 pages.

Extended EP Search Report for EP Application No. 10006450.0, mailed Oct. 14, 2010, 10 pages.

(Continued)

*Primary Examiner* — Charles Kyle
*Assistant Examiner* — Siegfried E Chencinski
(74) *Attorney, Agent, or Firm* — Brake Hughes Bellermann LLP

(57) ABSTRACT

In accordance with aspects of the disclosure, a system and methods are provided for managing working capital by scheduling payments to be paid for accounts payable based on payments received for accounts receivable relative to one or more time intervals while maintaining a predetermined working capital reserve threshold. The systems and methods may include calculating accounts receivable patterns for each customer to determine a confidence level in receiving payments from each customer within the one or more time intervals, generating one or more potential payment schemes for each vendor, and generating a payment schedule for accounts payable for each vendor within the one or more time intervals based on the determined confidence level for each customer and the one or more potential payment schemes for each vendor while maintaining the predetermined working capital reserve threshold.

20 Claims, 15 Drawing Sheets

(56) References Cited

OTHER PUBLICATIONS

Li, et al, "Placement of Multi-Tenant Database Applications for SaaS", SAP Research Center, China, 2009, 12 pages.
Phan, et al, "A Request-Routing Framework for SOA-Based Enterprise Computing", Proceedings of the International Conference on Very Large Data Bases, Aug. 2008, 12 pages.
Phan, et al, "Heuristics-Based Scheduling of Composite Web Service Workloads", MW4SOC '06, Nov. 27-Dec. 1, 2006, 6 pages.
Plattner, et al, "DBFarm: A Scalable Cluster for Multiple Databases", LNCS vol. 4290, 2006, pp. 180-200.
Yang, et al, "A Scalable Data Platform for a Large Number of Small Applications", 4th Biennial Conference on Innovative Data Systems Research (CIDR), Jan. 4-7, 2009, 10 pages.
Land, et al, "An Automatic Method of Solving Discrete Programming Problems", Econometrica, vol. 28, No. 3, 1960, pp. 497-520.
Graham, "Bounds for certain multiprocessing anomalies", Bell Systems Technical Journal, vol. 45, No. 9, 1966, pp. 1563-1581.
Hamilton, "On designing and deploying internet-scale services", Proc. of the 21st USENIX Large Installation System Administration Conference, 2007, pp. 233-244.
Costa, et al, "Evolutionary algorithms approach to the solution of mixed integer nonlinear programming problems", In Computers and Chemical Engineering 25, 2001, pp. 257-266.
Hart, et al, "A Formal Basis for the Heuristic Determination of Minimum Cost Paths", IEEE Transactions on Systems Science and Cybernetics SSC4, vol. 2, 1968, pp. 100-107.
Lima, et al, "Dynamic optimization of batch emulsion polymerization using MSIMPSA, a simulated-annealing-based algorithm", Ind. Eng. Chem. Res., vol. 43, No. 24, 2004, pp. 7796-7806.
Oliveira, et al, "Benchmark testing of simulated annealing, adaptive random search and genetic algorithms for the global optimization of bioprocesses", In International Conference on Adaptive and Natural Computing Algorithms, 2005, 292 pages.
Phan, et al, "Dynamic Materialization of Query Views for DataWarehouseWorkloads", Proceedings of the International Conference on Data Engineering, Apr. 2008, pp. 436-445.
Phan, et al, "Load distribution of analytical query workloads for database cluster architectures", Proceedings of the International Conference on Extended Database Technology, Mar. 2008, 12 pages.
Goffe, et al, "Global optimization of statistical functions with simulated annealing", Journal of Econometrcs, vol. 60, 1994, pp. 65-99.
Wustenhoff, "Service level agreement in the data center", Sun BluePrints, http://www.sun.com/blueprints/0402/sla.pdf, Apr. 2002, 12 pages.
Azar, et al, "On-line load balancing of temporary tasks", Journal of Algorithms, vol. 22, No. 1, 1997, pp. 93-110.
Non-Final Office Action for U.S. Appl. No. 12/758,597, mailed Dec. 7, 2012, 23 pages.
Non-Final Office Action Response for U.S. Appl. No. 12/758,597, filed Apr. 23, 2013, 15 pages.
Final Office Action for U.S. Appl. No. 12/758,597, mailed May 9, 2013, 27 pages.

* cited by examiner

600

The $l$-th gene in a chromosome represents a different level of a discount rate,
$$g_i = D_j,$$
where $D_j$ is an integer number, and $j = 1, 2, \ldots, l$, where $l$ is a number of levels of the discount rate.
In an example, where $l = 5$:

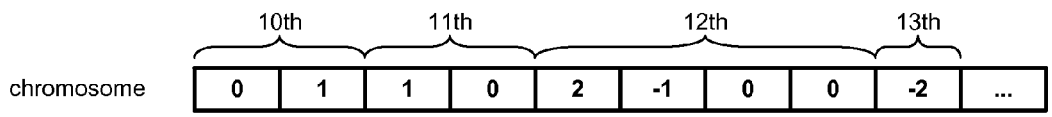

2 represents a date of payment 30-day-ahead or earlier,
1 represents a date of payment between 29-days-ahead and 10-day-ahead,
0 represents a date of payment between 9-day-ahead and a due date,
-1 represents a date of payment between 1-day-delay and 9-day-delay, and
-2 represents a date of payment between 10-day-delay and 29-day delay.

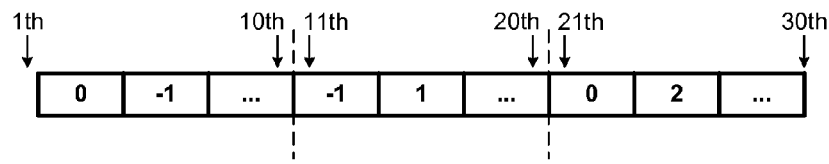

In the first 10 days, only 0, -1, and -2 are valid in GA coding.
From the 11th day to the 30th day, 0, -1, -2, and 1 are valid.
In the remainder part, 0, 1, 2 and -1, -2 are valid.

FIG. 6

METHOD AND SYSTEM FOR WORKING CAPITAL MANAGEMENT

CROSS-REFERENCE TO RELATED APPLICATION

This application claims priority under 35 U.S.C. §119 to U.S. Provisional Patent Application No. 61/532,896, filed Sep. 9, 2011, titled "METHOD AND SYSTEM FOR WORKING CAPITAL MANAGEMENT," which is incorporated herein by reference in its entirety.

TECHNICAL FIELD

The present description relates to computer-based techniques for working capital management.

BACKGROUND

Generally, businesses need to maintain a certain level of cash reserve as working capital. If the working capital reserve level is too high, it is not cost efficient. On the other hand, businesses may be at risk and may fail to operate consistently if the working capital reserve level is too low. As such, there exists a need to manage working capital in an efficient manner so as to maximize profits.

SUMMARY

In accordance with aspects of the disclosure, a computer system may be provided for working capital management including instructions recorded on a computer-readable medium and executable by at least one processor. The computer system may include a working capital manager configured to cause the at least one processor to schedule payments to be paid for accounts payable based on payments received for accounts receivable relative to one or more time intervals while maintaining a predetermined working capital reserve threshold. The working capital manager may include an account handler configured to retrieve account information for one or more customers from an accounts receivable database and to retrieve account information for one or more vendors from an accounts payable database. The working capital manager may include a risk handler configured to calculate accounts receivable patterns for each customer to determine a confidence level in receiving payments from each customer within the one or more time intervals. The working capital manager may include a genetic algorithm handler configured to generate one or more potential payment schemes for each vendor based on using an advanced payment for a discount and a delayed payment to consider the predetermined working capital reserve threshold. The working capital manager may include a payment optimizer configured to generate a payment schedule for accounts payable for each vendor within the one or more time intervals based on the determined confidence level for each customer and the one or more potential payment schemes for each vendor while maintaining the predetermined working capital reserve threshold.

In accordance with aspects of the disclosure, a computer-implemented method may be provided for working capital management. The computer-implemented method may include scheduling payments to be paid for accounts payable based on payments received for accounts receivable relative to one or more time intervals while maintaining a predetermined working capital reserve threshold by retrieving account information for one or more customers from an accounts receivable database, calculating accounts receivable patterns for each customer to determine a confidence level in receiving payments from each customer within the one or more time intervals, retrieving account information for one or more vendors from an accounts payable database, generating one or more potential payment schemes for each vendor based on using an advanced payment for a discount and a delayed payment to consider the predetermined working capital reserve threshold, and generating a payment schedule for accounts payable for each vendor within the one or more time intervals based on the determined confidence level for each customer and the one or more potential payment schemes for each vendor while maintaining the predetermined working capital reserve threshold.

In accordance with aspects of the disclosure, a computer program product may be provided, wherein the computer program product is tangibly embodied on a computer-readable storage medium and includes instructions that, when executed by at least one processor, are configured to schedule payments to be paid for accounts payable based on payments received for accounts receivable relative to one or more time intervals while maintaining a predetermined working capital reserve threshold. The computer program product may include instructions that, when executed by the processor, are configured to retrieve account information for one or more customers from an accounts receivable database, calculate accounts receivable patterns for each customer to determine a confidence level in receiving payments from each customer within the one or more time intervals, retrieve account information for one or more vendors from an accounts payable database, generate one or more potential payment schemes for each vendor based on using an advanced payment for a discount and a delayed payment to consider the predetermined working capital reserve threshold, and generate a payment schedule for accounts payable for each vendor within the one or more time intervals based on the determined confidence level for each customer and the one or more potential payment schemes for each vendor while maintaining the predetermined working capital reserve threshold.

The details of one or more implementations are set forth in the accompanying drawings and the description below. Other features will be apparent from the description and drawings, and from the claims.

BRIEF DESCRIPTION OF THE DRAWINGS

FIG. 6 is a diagram illustrating an example chromosome structure.

DETAILED DESCRIPTION

Figure 1:
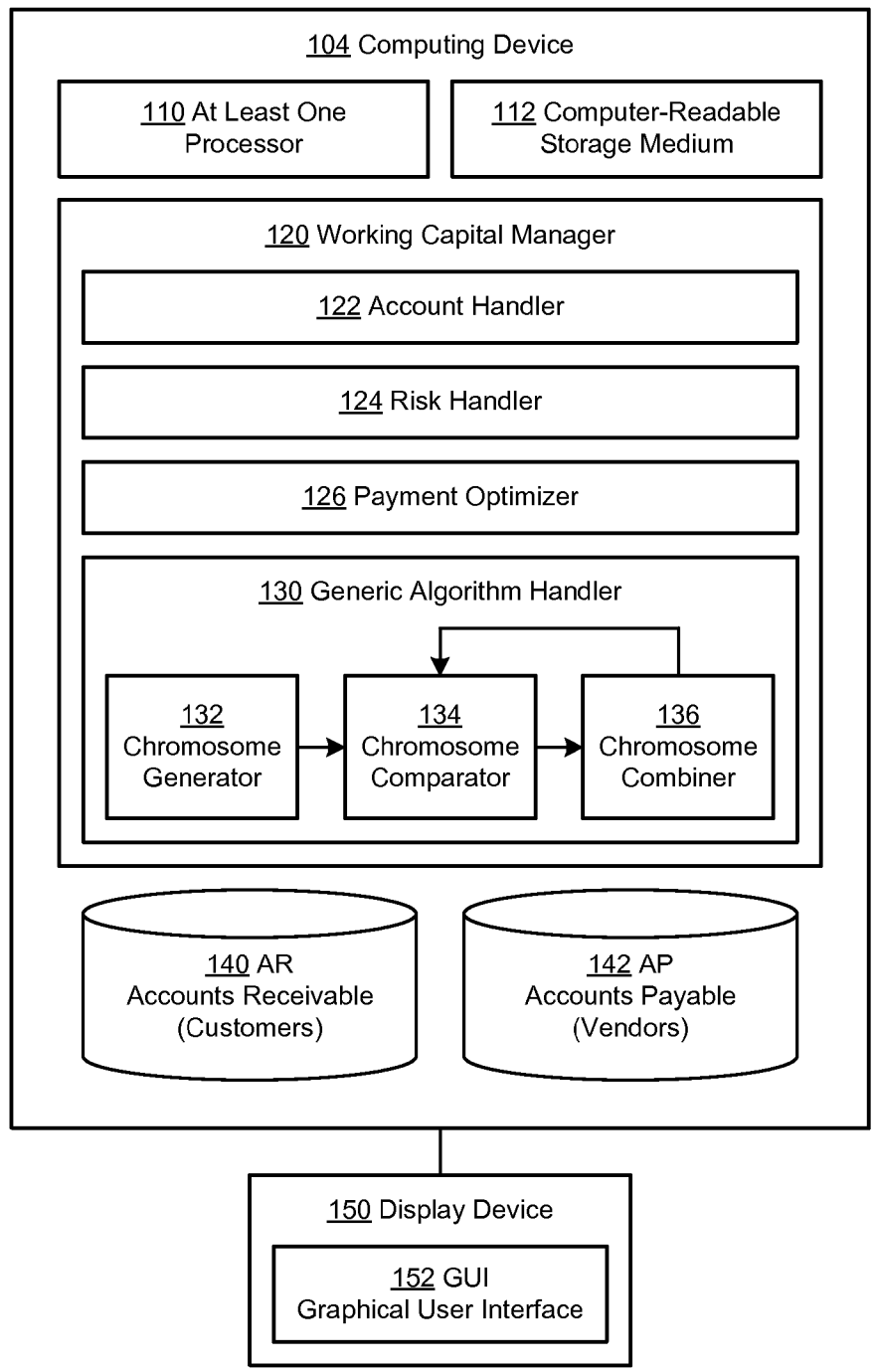
FIG. 1 is a block diagram illustrating an example system for managing working capital by implementing a genetic algorithm for payment scheduling.

FIG. 1 is a block diagram illustrating an example system 100 for managing working capital by implementing a genetic algorithm for payment scheduling.

In the example of FIG. 1, the system 100 comprises a computer system for implementing a working capital management system that may be associated with a computing device 104, thereby transforming the computing device 104 into a special purpose machine designed to determine and implement the scheduling process(es), as described herein. In this sense, it may be appreciated that the computing device 104 may include any standard element(s), including at least one processor(s) 110, memory (e.g., non-transitory computer-readable storage medium) 112, power, peripherals, and various other computing elements not specifically shown in FIG. 1. Further, the system 100 may be associated with a display device 150 (e.g., a monitor or other display) that may be used to provide a graphical user interface (GUI) 152. In an implementation, the GUI 152 may be used, for example, to receive preferences from a user for managing or utilizing the system 100. It should be appreciated that various other elements of the system 100 that may be useful to implement the system 100 may be added or included, as would be apparent to one of ordinary skill in the art.

Accordingly, in the example of FIG. 1, the working capital management system 100 may include the computing device 104 and instructions recorded on the computer-readable medium 112 and executable by the at least one processor 110. In an implementation, the working capital management system 100 may include the display device 150 for providing output to a user, and the display device 150 may include the graphical user interface (GUI) 152 for receiving input from the user.

The working capital management system 100 may include a working capital manager 120 configured to cause the at least one processor 110 to schedule payments to be paid for accounts payable based on payments received for accounts receivable relative to one or more time intervals while maintaining a predetermined working capital reserve threshold. The working capital manager 120 may be configured to manage and control a working capital level (i.e., a cash level or a cash reserve level) within a desirable range or at least above a desirable level using, for example, a set of rules. In various examples, additional rules may be applied to the working capital management system 100 by adding the additional rules to "fitness functions" in a genetic algorithm for payment scheduling, in a manner as described herein.

In an aspect of the disclosure, the predetermined working capital reserve threshold refers to a cash reserve threshold that may be predetermined based on input received from a user. The cash reserve threshold may be adapted to consider a target cash reserve level (TCRL) for indicating when a working capital amount is equal to or at least greater than the target cash reserve level (TCRL). The cash reserve threshold may be adapted to consider a low cash reserve level (LCRL) for indicating when the working capital amount is within a range proximate to the target cash reserve level (TCRL). The cash reserve threshold may be adapted to consider a critical cash reserve level (CCRL) for indicating when the working capital amount is less than the target cash reserve level (TCRL), which may be considered a critically low level. The cash reserve threshold may be adapted to consider an excessive cash reserve level (ECRL) for indicating when the working capital amount is greater than the target cash reserve level (TCRL), which may be considered an excessively high level. These and various other related aspects are described in greater detail herein.

In the example of FIG. 1, the working capital manager 120 may include an account handler 122 configured to retrieve account information for one or more customers from an accounts receivable (AR) database 140 and to retrieve account information for one or more vendors from an accounts payable (AP) database 142. The account handler may be further configured to obtain a plurality of forthcoming accounts receivable from the retrieved account information for the one or more customers from the AR database 140, and obtain a plurality of forthcoming accounts payable from the retrieved account information for the one or more vendors from the AP database 142.

The working capital manager 120 may include a risk handler 124 configured to calculate accounts receivable patterns for each customer to determine a confidence level in receiving payments from each customer within the one or more time intervals. The risk handler 124 may be further configured to estimate a mean and variance of one or more expected dates for receiving payment from each customer before or after a payment due date according to the calculated accounts receivable patterns of payment selection for each customer, and determine the one or more expected dates for receiving payment from each customer based on the determined confidence level. These and various other related aspects are described in greater detail herein.

The working capital manager 120 may include a genetic algorithm handler 130 configured to generate one or more potential payment schemes for each vendor based on using, in various examples, at least one of an advanced payment for a discount and a delayed payment to consider the predetermined working capital reserve threshold. The genetic algorithm handler may be further configured to generate the one or more potential payment schemes for each vendor based on using a late payment at the cost of a penalty while considering the predetermined working capital reserve threshold.

The working capital manager 120 may include a payment optimizer 126 configured to generate a payment schedule for accounts payable for each vendor within the one or more time intervals based on the determined confidence level for each customer and the one or more potential payment schemes for each vendor while maintaining the predetermined working capital reserve threshold.

The payment optimizer 126 may be further configured to evaluate each generated potential payment scheme for each vendor, select a best potential payment scheme for each vendor by considering a largest discount while maintaining the predetermined working capital reserve threshold, and transform one or more of the accounts payable (AP) vendors to a fixed payment (FP) vendor for future payment optimization based on the selected best potential payment scheme. The fixed payment (FP) vendor does not provide a discount for advanced payment.

In the example of FIG. 1, the genetic algorithm handler 130 may include a chromosome generator 132 configured to generate or create the one or more potential payment schemes as one or more payment schedule chromosomes for each vendor based on using, in various examples, at least one of an advanced payment for a discount, a late payment for a penalty, and a delayed payment to consider the predetermined working capital reserve threshold.

The genetic algorithm handler 130 may include a chromosome comparator 134 configured to compare a plurality of payment schedule chromosomes, wherein each payment schedule chromosome may include the one or more potential payment schemes for each vendor within the one or more time intervals based on the determined confidence level for each customer. The chromosome comparator 134 may be further configured to compare each of the plurality of payment schedule chromosomes relative to the predetermined working capital reserve threshold to thereby output a selected subset of the plurality of payment schedule chromosomes.

The genetic algorithm handler 130 may include a chromosome combiner 136 configured to combine payment schedule chromosomes of the selected subset of the plurality of payment schedule chromosomes to obtain a next generation of payment schedule chromosomes for output to the chromosome comparator 134 and for subsequent comparison therewith of the next generation of payment schedule chromosomes with respect to the predetermined working capital reserve threshold, as part of an evolutionary loop of the plurality of payment schedule chromosomes between the chromosome comparator 134 and the chromosome combiner 136. In this instance, for example, the payment optimizer 126 may be further configured to monitor the evolutionary loop and select a selected payment schedule chromosome therefrom for implementation of the payment schedule based thereon. The payment optimizer 126 may be further configured to select the selected payment schedule chromosome after a predetermined number of generations of the evolutionary loop, or after determining that the selected payment schedule chromosome satisfies the predetermined working capital reserve threshold.

In an implementation, the chromosome combiner 136 may be further configured to combine the payment schedule chromosomes including selecting pairs of payment schedule chromosomes and crossing over portions of each pair of payment schedule chromosomes to obtain a child chromosome of the next generation.

Further, in an implementation, at least a portion of the evolutionary loop may be executed using parallel processes in which each generation of payment schedule chromosomes is divided into sub-groups for parallel processing thereof.

In accordance with aspects of the disclosure, the term(s) working capital management, cash flow management, and similar terms are exchangeable. Further, the description(s) of means for controlling the cash level, cash reserve level, and/or working capital level within a desirable range or above a desirable level using a set of rules should be viewed as an example or implementation, and as such, additional rules may be added to the working capital management system 100 and/or components thereof by adding them to one or more "fitness functions" in the scheduling algorithm presented herein.

Further, in accordance with aspects of the disclosure, there are types of financial activities that may impact daily working capital levels. Some examples include accounts receivable (AR), accounts payable (AP), and fixed payments (FP).

Accounts receivable may refer to money owed to a business by clients or customers, which may be shown on a balance sheet of the business as an asset. As such, accounts receivable may refer to accounting transactions relating to billing a customer for ordered goods and/or services and receiving a subsequent payment from the customer.

In an aspect of the disclosure, referring to account receivable, a payment due date for an order from a customer may include some specified time frame, such as 90 days, after delivery of ordered goods and/or services. In some instances, there may be a discount given to the customer. The implementation may follow a predetermined format, such as applying a term d % discount, if paid within x number of days. For instance, if a balance is paid in full prior to the payment due date, such as, for example, within 60 days of the due date, there may be a discount term of a predetermined value or percentage, such as, for example, 3% of the balance. In another instance, if the balance is paid in full prior to the payment due date, such as, for example, within 30 days of the due date, there may be a discount term of another predetermined value or percentage, such as, for example, 1% of the balance. Otherwise, there may be no discount if the balance is paid at the payment due day or within, for example, 30 days from the payment due date. Further, there may be a penalty for late payment, such as, for example, a penalty term of, for example, 1% of the payment due, if the payment is paid after the payment due date, such as, for example, 30 days or more after the payment due date. The AR discount term(s) and/or penalty term(s) may be predetermined and customer specific. However, the AR discount term(s) and/or AR penalty term(s) may be also may be order specific. In some examples, the AR discount term(s) and/or AR penalty term(s) may change frequently or infrequently depending on specific instances of customer implementations.

Accounts payable may refer to money owed to a vendor by a business, which may be shown on a balance sheet of the business as trade payables. For instance, when an invoice is received from a vendor, the invoice may be added to the balance sheet and removed when paid. Thus, accounts payable may be considered as a form of credit that vendors offer to a business by allowing payment for goods and/or services after receiving the goods and/or services. As such, accounts payable may refer to accounting transactions relating to paying a vendor for ordered goods and/or services and providing a subsequent payment to the vendor after receiving the ordered goods and/or services.

In an aspect of the disclosure, accounts payable may refer to a payment to be paid to vendors for goods and/or services ordered. As with accounts receivable, there are discount terms and penalty terms associated with accounts payable that may be set by the vendors. The implementation may follow a predetermined format, such as applying a term d % discount, if paid within x number of days. For instance, discount terms may apply to whether the balance due is paid in full prior to a payment due date, such as, for example, within 60 days of the payment due date, which may correspond to a discount of a predetermined value or percentage, such as, for example, 3% of the balance. In another instance, if the balance is paid in full prior to a payment due date, such as, for example, within 30 days prior to the payment due date, which may correspond to a discount of 1% of the balance. Otherwise, there may be no discount if the balance is paid at the payment due date or within, for example, 30 days from the payment due date. Further, there may be a penalty for late payment, such as, for example, a penalty term of, for example, 1% of the payment due if the payment is paid after the payment due date, such as, for example, 30 days or more after the due date. The discount term(s) and/or penalty term(s) for the accounts payable may be set by the vendors. As such, the AP discount term(s) and/or AP penalty term(s) may be predetermined and vendor specific. However, the AP discount term(s) and/or AP penalty term(s) may be also may be order specific. In some examples, the AP discount term(s) and/or AP penalty term(s) may change frequently or infrequently depending on specific instances of vendor implementations.

Fixed payment (FP) may refer to some cash payment events that have no discount, such as, for example, employee salary, utility type payments, etc., and should or must be paid on or before a particular date. For instance, employee salaries should or must be paid on or before a scheduled pay date. For utility type payments and various other similar type of payments, payment may be delayed at cost of a late payment penalty or fee. In an example, a predetermined value or percentage, such as 1%, of the balance due may be added to the owed balance as a penalty, but the entire balance should or must be paid in full within a specific period, such as, for example, within 60 days, otherwise there may be some type of legal consequence or liquidation date.

In an aspect of the disclosure, example requirement(s) for working capital management provides for maintaining a desirable or predetermined cash reserve level that may be set in a desired or predetermined manner. For instance, the working capital or cash reserve should be maintained above a TCRL. However, the working capital or cash reserve may drop below a LCRL for a particular number of days over a period or a number of consecutive days in a period. However, in any event, the working capital or cash reserve should not drop below a CCRL at any time. Since working capital or cash inflow may only be estimated and not controlled, then as accounts receivables are paid by customers, at least one parameter may be configured that refers to a confidence (or risk) level of a payment inflow estimation strategy.

In an aspect of the disclosure, the payment inflow estimation strategy may be set as at least one of aggressive, neutral, and conservative. For example, it may occur that every day, a new set of AR and AP may be generated and entered to the system, and the payment schedule is preferably managed (e.g., selecting when to provide payment and selecting what discount to take) assuming the pattern of customers payment selection is available (e.g., 20% of time, a 3% discount is selected; 50% of the time a 1% discount is selected; and 30% of payments are made on time).

In the example of FIG. 1, the working capital management system 100 may be configured to recommend an AP payment schedule that, for one, meets the cash reserve requirements, and two, maximizes any discounts that may be received for AP based on a payment inflow estimation strategy specified for AR. Further, the cash reserve requirements may be defined with hard or soft conditions, and a scoring function may be defined by users to weight importance of each cash reserve requirement.

In an aspect of the disclosure, the working capital manager 104 may be configured to select an optimal or near-optimal AP payment scheduling solution that defines specific time intervals for maintaining desired or predetermined cash reserve levels while optimizing any discounts that may be received via early payment to each vendor, to thereby obtain desired results, such as increased profitability.

As such, the working capital management system 100 of FIG. 1 (in particular, the working capital manager 104) may be configured to provide an optimal or at least near-optimal AP payment scheduling solution, in a quick, efficient, and reliable manner. The system 100 may also be configured to provide one or more simulations of possible payment scheduling solutions (e.g., potential payment schemes that may be referred to as payment schedule chromosomes), as well as associated "what-if" scenario modeling of AP payment scheduling that allows for informed decisions about everyday business practices and transactions.

The system 100 may be configured to implement a randomized algorithm approach known as a genetic algorithm (GA), which may refer generally to a computer simulation of Darwinian natural selection that iterates through successive generations to converge toward a best solution in a problem/solution space. Such a genetic algorithm may be used by the system 100 to consider requirements and/or related parameters (e.g., working capital reserves including cash reserves) into the payment scheduling optimization process. Further, the working capital management system 100 is capable of recommending and/or selecting "best-available" payment schedules.

In the system 100, the genetic algorithm approach may be implemented, for example, by creating a "chromosome" representing a possible solution to the problem of scheduling AP payments. Specific examples of such payment schedule chromosomes are described herein. However, generally speaking, it should be appreciated that such payment schedule chromosomes may include one or more potential payment schemes for each AP vendor within one or more time intervals based on a determined confidence level for each AR customer. Further, it should be appreciated that such potential payment schemes may be used to compare each of the payment schedule chromosomes relative to a predetermined working capital reserve threshold, to thereby output a selected subset of payment schedule chromosomes. Therefore, there may be a single such payment schedule chromosome that may represent the single best payment scheduling solution for a given set of payment scheduling objectives to thereby optimize profits). However, optimization of payment schemes (i.e., payment schedule chromosomes) may be relative to needs of a user and various other factors, parameters, and/or requirements. Due to the nature of the genetic algorithms used herein, the working capital manager 104 may find a "best" solution that is close to an optimal solution, even if the actual optimal solution is not identifiable as such.

In this regard, the working capital manager 104 may be configured to optimize scheduling AP payments relative to one or more objectives. One such metric may include profitability. For example, some AP vendors may be more profitable than others, and/or profitability may be enhanced by exhibiting a preference for behaviors associated with increased profitability. On the other hand, other additional or alternative metrics may have value besides pure profitability. For instance, a gain in market share may be a valuable metric to consider.

As such, in an example, the payment optimizer 126 may be configured for tuning preferences to provide designations between possible objectives of the working capital manager 104, and it should be appreciated that various factors, parameters, and/or requirements may be considered to be necessary or optional. For instance, in scenarios in which profitability should be optimized, a full utilization of the genetic algorithm may be an option but not a requirement.

The working capital manager 120 may be configured to utilize the genetic algorithm via the genetic algorithm handler 130 to create, compare, and combine multiple payment schedule chromosomes in a manner to create a new generation or population of payment schedule chromosomes for evaluation so that a subset thereof may be selected for reproduction and subsequent evaluation. In this way, each generation/population of payment schedule chromosomes may tend to converge toward an optimal solution for scheduling AP payments. The payment optimizer 126 may be configured to select a particular one of the AP payment schedule solutions (i.e., potential payment schemes or payment schedule chromosomes) for use in scheduling AP payments.

In the example of FIG. 1, the genetic algorithm handler 122 may include the chromosome generator 132 configured for generating one or more payment schedule chromosomes. Such payment schedule chromosome generation may occur at random or may include some initial guidelines or restrictions. The chromosome generator 126 may be configured to generate an initial population or set of payment schedule chromosomes, which may be evaluated by the chromosome comparator 134 configured for comparing each payment schedule chromosome including the one or more potential payment schemes for each AP vendor within the one or more time intervals based on the determined confidence level for each AR customer, and configured to compare each payment schedule chromosome relative to a predetermined working capital reserve threshold, to thereby output a selected subset of the payment schedule chromosomes, which may preferably represent the best available AP payment schedules. These and various other related aspects are described in greater detail herein.

The chromosome combiner 136 may receive the selected subset of the plurality of payment schedule chromosomes and may be configured to combine (e.g., crossover and mutate) payment schedule chromosomes of the selected subset of the plurality of payment schedule chromosomes to obtain a next generation (population) of payment schedule chromosomes for output to the chromosome comparator 134, which may then perform another, subsequent comparison therewith of the next generation of payment schedule chromosomes with consideration of the predetermined working capital reserve threshold, as part of an evolutionary loop of successive generations of the plurality of payment schedule chromosomes between the chromosome comparator 134 and the chromosome combiner 136. With each successive generation, the new population of payment schedule chromosomes may represent or include possible improved or near-optimal schedule(s). New generations/populations may be iteratively created until either an optimal solution is met, or until factors, preferences, and/or requirements are met up to some predefined satisfactory level or threshold, or until a pre-determined number of generations is calculated, or until time runs out to compute new generations/populations (at which point a best solution of the current generation may be selected).

As referenced above, the payment optimizer 126 may be configured to monitor the evolutionary loop and to select a selected payment schedule chromosome therefrom for implementation of the payment schedule based thereon. As referenced herein, the selected payment schedule chromosome/solution may represent either a best (optimal or near optimal) solution, or may represent a best-available solution. Thus, the payment optimizer 126 may be tasked with determining whether, when, and how to interrupt or otherwise end the evolutionary loop and extract the best, best-available, optimal, or near optimal solution. Then, the payment optimizer 126 may output a selected payment schedule chromosome and/or execute an actual payment schedule.

In the example of FIG. 1, it should be appreciated that the working capital management system 100 is illustrated using various functional blocks or modules that represent more-or-less discrete functionality. However, such illustration is provided for clarity and convenience, and thus, it should be appreciated that the various functionalities may overlap or be combined within a described block(s) or module(s), and/or may be implemented by one or more block(s) or module(s) not specifically illustrated in the example of FIG. 1. Generally, conventional functionality that may be useful to the system 100 of FIG. 1 may be included as well even though such conventional elements are not illustrated explicitly, for the sake of clarity and convenience.

Figure 2:
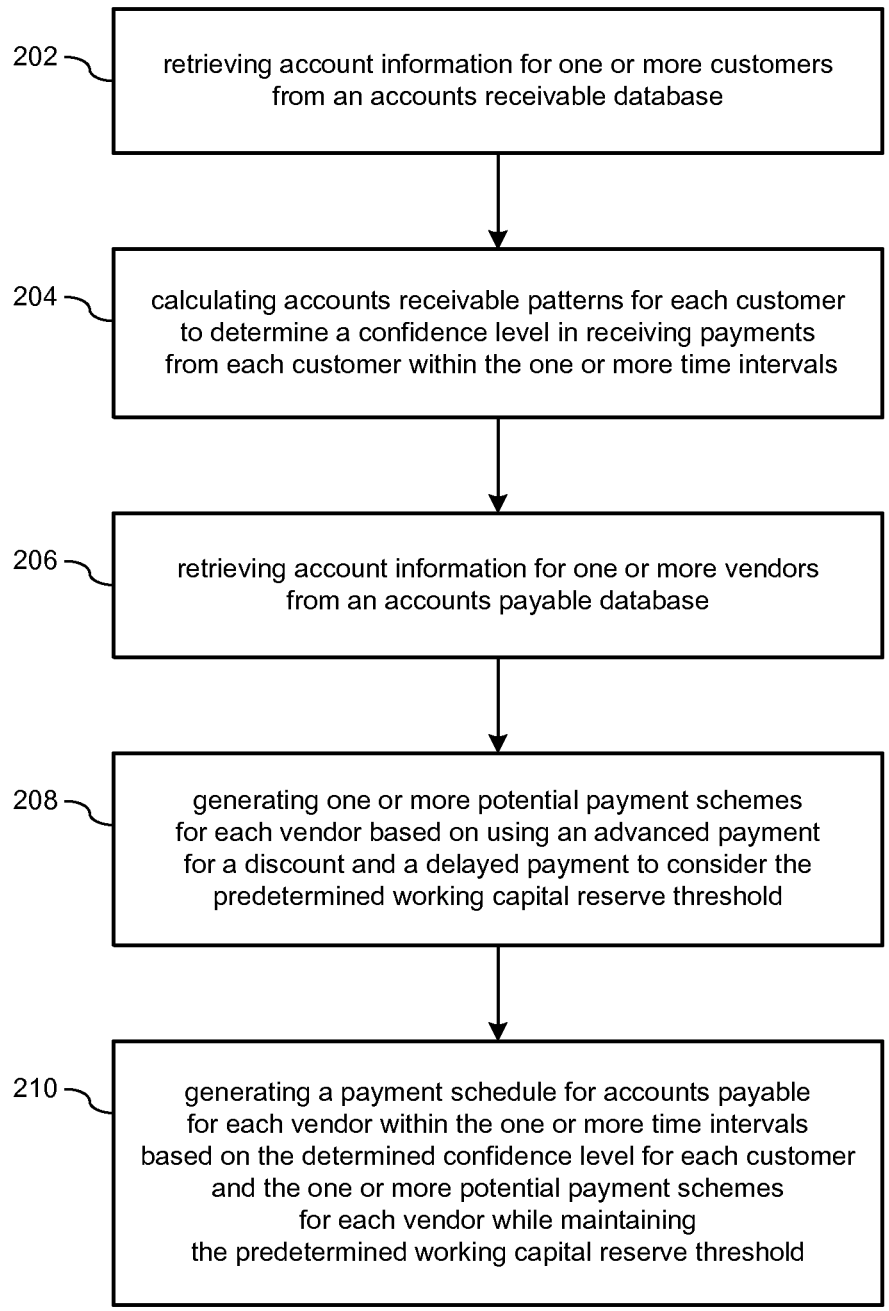
FIG. 2 is a process flow illustrating an example method for managing working capital by implementing a genetic algorithm for payment scheduling.

FIG. 2 is a process flow illustrating an example method 200 for managing working capital by implementing a genetic algorithm for payment scheduling. In the example of FIG. 2, operations 202-210 are illustrated as discrete operations occurring in sequential order. However, it should be appreciated that, in other implementations, two or more of the operations 202-210 may occur in a partially or completely overlapping or parallel manner, or in a nested or looped manner, or may occur in a different order than that shown. Further, additional operations, that may not be specifically illustrated in the example of FIG. 2, may also be included in some implementations, while, in other implementations, one or more of the operations 202-210 may be omitted.

In the example of FIG. 2, the method 200 may include a process flow for a computer-implemented method for managing working capital in the working capital management system 100 of FIG. 1. Further, as described herein, the operations 202-210 provide a simplified operational process flow that may be enacted by the computer system 104 to provide features and functionalities as described in reference to FIG. 1.

In an aspect of the disclosure, the method 200 is provided for scheduling payments to be paid for accounts payable (AP) based on payments received for accounts receivable (AR) relative to one or more time intervals while maintaining a predetermined working capital reserve threshold. As previously described herein, the working capital reserve threshold may refer to a cash reserve threshold that considers at least one of the TCRL, LCRL, CCRL, and ECRL. The TCRL indicates when a working capital amount is equal to or at least greater than the TCRL. The LCRL indicates when the working capital amount is within a range proximate to the TCRL. The CCRL indicates when the working capital amount is less than the TCRL and considered a critically low level. The ECRL indicates when the working capital amount is greater than the target cash reserve level and considered an excessively high level.

In the example of FIG. 2, at 202, the method 200 may include retrieving account information for one or more customers from the accounts receivable (AR) database 140. In an implementation, the method 200 may further include obtaining a plurality of forthcoming accounts receivable (AR) from the retrieved account information for the one or more customers from the accounts receivable (AR) database 140.

At 204, the method 200 may include calculating accounts receivable (AR) patterns for each customer to determine a confidence level in receiving payments from each customer within the one or more time intervals. For instance, in reference to an order from a customer, the payment due date may be within a specific time period (e.g., 90 days) after goods and/or services for the order have been delivered. In some instances, a specific AR discount term may be assigned to each customer, which may be customer specific and/or order specific.

At 206, the method 200 may include retrieving account information for one or more vendors from an accounts payable (AP) database 142. In an implementation, the method 200 may further include obtaining a plurality of forthcoming accounts payable (AP) from the retrieved account information for the one or more vendors from the accounts payable (AP) database 142.

At 208, the method 200 may use a genetic algorithm for generating one or more potential payment schemes for each vendor based on using at least one of an advanced payment for a discount and a delayed payment to consider the predetermined working capital reserve threshold. In an implementation, the method 200 may use the genetic algorithm for generating the one or more potential payment schemes for each vendor based on using a late payment penalty while considering the predetermined working capital reserve threshold.

In another implementation, the method 200 may use the genetic algorithm for comparing a plurality of payment schedule chromosomes, wherein each payment schedule chromosome may include the one or more potential payment schemes for each vendor within the one or more time intervals based on the determined confidence level for each customer. The method 200 may use the genetic algorithm for comparing each of the plurality of payment schedule chromosomes relative to the predetermined working capital reserve threshold, to thereby output a selected subset of the plurality of payment schedule chromosomes. The method 200 may use the genetic algorithm for combining payment schedule chromosomes of the selected subset of the plurality of payment schedule chromosomes to obtain a next generation of payment schedule chromosomes for output to the chromosome comparator and for subsequent comparison therewith of the next generation of payment schedule chromosomes with respect to the predetermined working capital reserve threshold, as part of an evolutionary loop of the plurality of payment schedule chromosomes. In this instance, the method 200 may further include monitoring the evolutionary loop and selecting a selected payment schedule chromosome therefrom for implementation of the payment schedule based thereon.

In another implementation, the method 200 may use the genetic algorithm for combining the payment schedule chromosomes including selecting pairs of payment schedule chromosomes and crossing over portions of each pair of payment schedule chromosomes to obtain a child chromosome of the next generation.

In another implementation, the method 200 may use the genetic algorithm for executing at least a portion of the evolutionary loop using parallel processes in which each generation of payment schedule chromosomes is divided into subgroups for parallel processing thereof. In this instance, the method 200 may further include selecting the selected payment schedule chromosome after a predetermined number of generations of the evolutionary loop, or after determining that the selected payment schedule chromosome satisfies the predetermined working capital reserve threshold.

In the example of FIG. 2, at 210, the method 200 may include generating a payment schedule for accounts payable (AP) for each vendor within the one or more time intervals based on the determined confidence level for each customer and the one or more potential payment schemes for each vendor while maintaining the predetermined working capital reserve threshold.

In an implementation, the method 200 may further include evaluating each generated potential payment scheme for each vendor, selecting a best potential payment scheme for each vendor by considering a largest discount while maintaining the predetermined working capital reserve threshold, and transforming one or more of the accounts payable vendors to a fixed payment vendor for future payment optimization based on the selected best potential payment scheme. The fixed payment vendor may provide no discount for advanced payment.

In an implementation, the method 200 may further include estimating a mean and variance of one or more expected dates for receiving payment from each customer before or after a payment due date according to the calculated accounts receivable patterns of payment selection for each customer and determining the one or more expected dates for receiving payment from each customer based on the determined confidence level.

In the example of FIG. 2, the method 200 for managing working capital may be configured to recommend an AP payment schedule that, for one, meets the cash reserve requirements, and two, maximizes any discounts that may be received for AP based on a payment inflow estimation strategy specified for AR. Further, the cash reserve requirements may be defined with hard or soft conditions, and a scoring function may be defined by users to weight importance of each cash reserve requirement.

Figure 3:
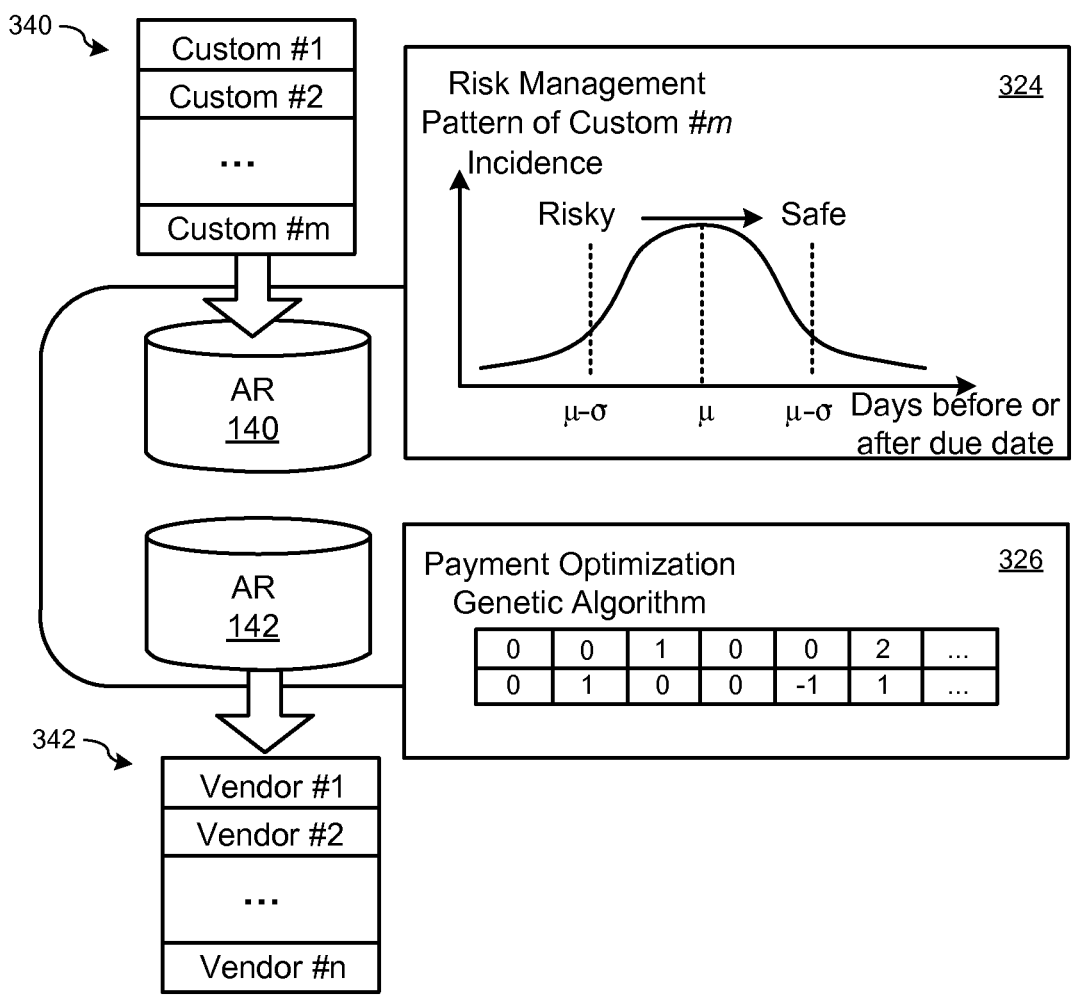
FIG. 3 is a block diagram illustrating an example system architecture for managing accounts receivable (AR) information of customers and accounts payable (AP) information for vendors.

FIG. 3 is a block diagram illustrating an example system architecture 300 for managing accounts receivable (AR) information of one or more customers 340 and accounts payable (AP) information for one or more vendors 342.

In the example system architecture 300 of FIG. 3, the AR information of the one or more customers 340 is stored in the AR database 140, as provided in the system 100 of FIG. 1, and the AP information of the one or more vendors 342 is stored in the AP database 142, as provided in the system 100 of FIG. 1. The system architecture 300 utilizes the AR customer information that is stored, available, and accessible via the AR database 140 and the AP vendor information that is stored, available, and accessible via the AP database 142.

The system architecture 300 utilizes a risk management component 324 to calculate one or more AR payment patterns of each customer 340. In reference to the system 100, such AR payment patterns may be used by the risk handler 124 to manage and/or control a confidence level (i.e., risk level) in the payment optimization process. The system architecture 300 utilizes a payment optimization component 326 to generate an AP payment schedule based on one or more potential AP payment schemes to maintain a predetermined working capital reserve threshold (i.e., cash reserve level requirement) that may be received from the user and optimize any discounts that may be received via early payment to each vendor 342. In reference to the system 100, such AP payment optimization may be used by the payment optimizer 126 to optimize AP payment scheduling based on the determined confidence level for each customer 340 and the one or more potential payment schemes for each vendor 342 while maintaining the predetermined working capital reserve threshold. As described herein, the payment optimization algorithm may be based on a genetic algorithm to create or generate an optimal, near-optimal, or sub-optimal but acceptable AP payment scheduling solution.

In an implementation, the system architecture 300 may be implemented using, for example, an SAP HANA Database for near real time performance. That is, the HANA (High Performance Analytical Appliance) product from SAP AG of Walldorf, Germany is known to provide in-memory data management for fast, efficient, and reliable processing of large volumes of data. An example of a detailed genetic algorithm is provided herein in reference to the following pseudo code.

Firstly, in an aspect of the disclosure, risk of receiving accounts receivable (AR) may be estimated by adjusting one or more certain expected dates of receiving payment from each customer 340 before or after a AR payment due date. For instance, the earlier the receiving date is expected, the more risk it suffers from. Motivated by this idea, the mean value and variance of days of shift for receiving may be calculated for each customer 340 to obtain their payment pattern(s), then the payment scheme for accounts payable (AP) may be scheduled under a certain receiving risk.

Accordingly, the AP payment scheduling problem may be turned into an optimization problem, which aims to obtain a maximum discount due to the beforehand payment while maintaining the predetermined working capital reserve threshold (i.e., cash reserve level requirement). Some AP payments should be paid on the payment due date, which may be referred to as a fixed payment (FP), which may also be considered in the payment optimization process.

In an aspect of the disclosure, by using the genetic algorithm, a best and/or reasonable payment scheme may be selected for forthcoming AP payments for each vendor 342 in a closed circle or loop. In particular, the system architecture 300 of FIG. 3 may implement the randomized algorithm approach, as described herein, known as the genetic algorithm (GA), which refers generally to a computer simulation of Darwinian natural selection that iterates through successive generations to converge toward a best solution in a problem/solution space. Thus, in an example, the payment due dates of each AP vendor 342 may be determined and/or transformed into a fixed payment (FP) vendor for payment optimization in a next closed circle or loop.

Figure 4:
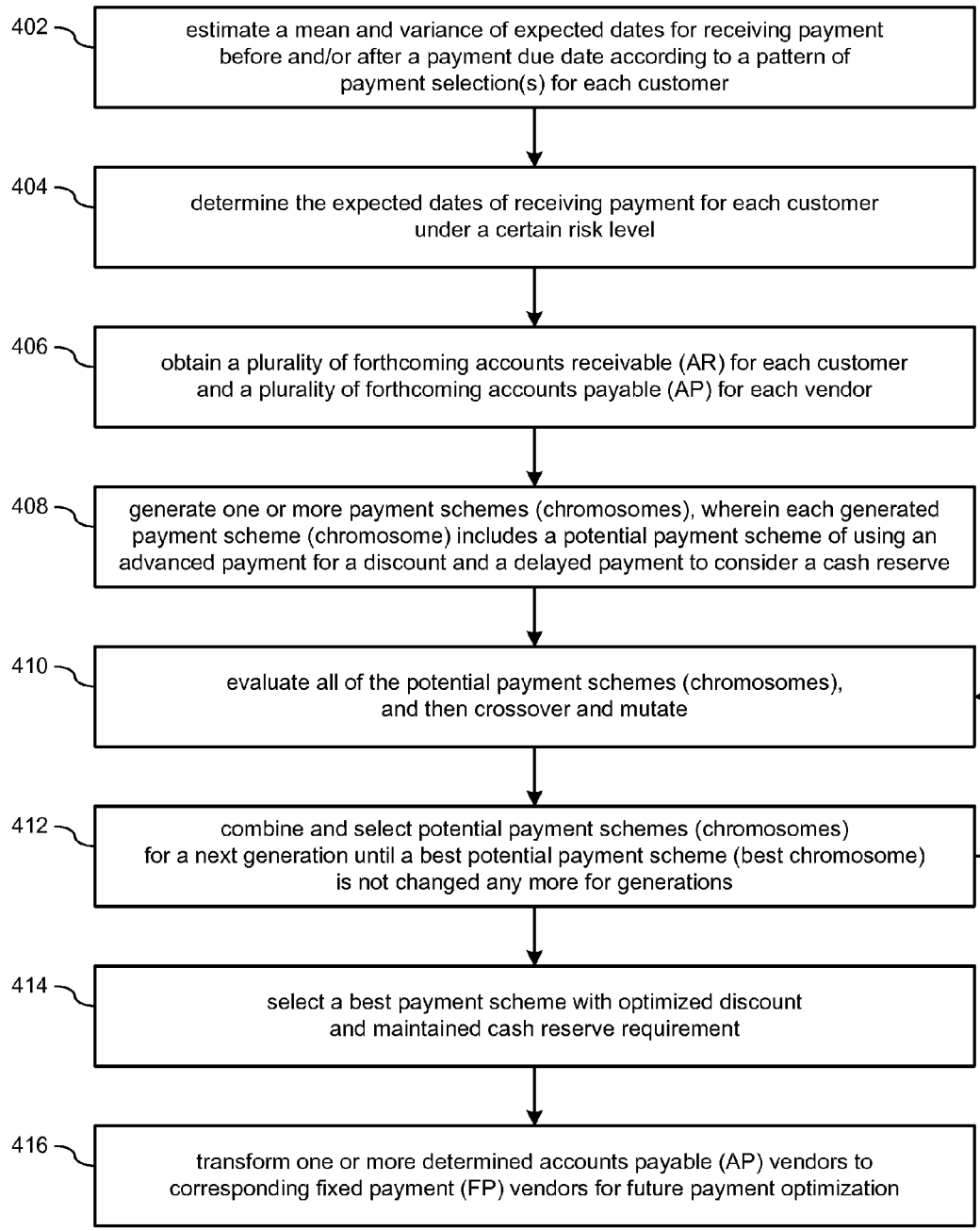
FIG. 4 is a process flow illustrating another example method for managing working capital by implementing a genetic algorithm for payment scheduling.

FIG. 4 is a process flow illustrating an example method 400 for managing working capital by implementing a genetic algorithm for payment scheduling. In the example of FIG. 4, operations 402-416 are illustrated as separate, sequential operations. However, it should be appreciated that two or more of the operations 402-416 may be conducted in a partially or completely overlapping or parallel manner. Moreover, the operations 402-416 may be implemented in a different order than that shown, and it should be appreciated that additional or alternative operations, not specifically illustrated in the example of FIG. 4, may be included, and one or more of the operations 402-416 may be omitted. Further, as illustrated with respect to the operations 410-412, various ones of the operations 402-416 may be implemented in an iterative, looped, or nested fashion, or otherwise may be implemented in an order and manner consistent with obtaining a desired payment scheduling result from the system 100 of FIG. 1.

At 402, the method 400 may be configured to estimate a mean and variance of expected dates for receiving payment before and/or after a payment due date according to a pattern of payment selection(s) for each customer. In an implementation, risk (i.e., confidence) of receiving accounts receivable (AR) may be estimated by adjusting expected date(s) of receiving payment before or after the due date. The earlier the receiving date is expected, the more risk it may suffer from. As such, a mean value and a variance of days of shift for receiving is calculated for each customer to obtain their payment pattern, then the payment scheme for accounts payable (AP) may be scheduled under a certain receiving risk.

At 404, the method 400 may be configured to determine the expected dates of receiving payment for each customer under a certain risk level (i.e., certain confidence level). In reference to a customer order, a payment due date may be within a predetermined number of days (e.g., 90 days) after the goods and/or services for the order has been delivered. Cash inflow is estimated as account receivables (AR) are paid by customers, and a parameter to configure a risk level (i.e., confidence level) of payment cash inflow estimation strategy for each customer. The strategy may be set as aggressive, neural, conservative, or some combination thereof.

At 406, the method 400 may be configured to obtain a plurality of forthcoming accounts receivable (AR) for each customer and a plurality of forthcoming accounts payable (AP) for each vendor. The forthcoming AR information for customers and forthcoming AP information for vendors are stored and available in the system 100 of FIG. 1. The system 100 uses risk management to calculate the AR payment patterns of each customer, wherein such patterns are used to control confidence (i.e. risk level). The system 100 uses payment optimization to generate an AP payment schedule for the vendors to meet the cash reserve level requirements and optimize any the discounts that may be received via early payment to the AP vendors.

At 408, the method 400 may be configured to generate one or more payment schemes (chromosomes), wherein each generated payment scheme (chromosome) includes a potential payment scheme of using an advanced payment for a discount and a delayed payment to consider a cash reserve (i.e., a predetermined working capital reserve). Further, in an example, each potential payment scheme may consider a late payment for a penalty.

For instance, the system 100 compares a plurality of payment schedule chromosomes, wherein each payment schedule chromosome includes one or more potential payment schemes for each vendor within one or more time intervals based on a determined confidence level for each customer. The system further compares each of the plurality of payment schedule chromosomes relative to the predetermined working capital reserve threshold to thereby output a selected subset of the plurality of payment schedule chromosomes. The system 100 further combines the payment schedule chromosomes of the selected subset of the plurality of payment schedule chromosomes to obtain a next generation of payment schedule chromosomes and for subsequent comparison therewith of the next generation of payment schedule chromosomes with respect to the predetermined working capital reserve threshold, as part of an evolutionary loop of the plurality of payment schedule chromosomes. The system 100 monitors the evolutionary loop and select a selected payment schedule chromosome therefrom for implementation of the payment schedule based thereon.

In the example of FIG. 4, at 410, the method 400 may be configured to evaluate all of the potential payment schemes (chromosomes), and then crossover and mutate. The system 100 may use the genetic algorithm to crossover one or more of the chromosomes by combining the chromosomes in a role of parents to execute a simulation of sexual crossover to obtain a new child chromosome, which may be part of a new generation of chromosomes that may provide further crossover with other members of the same generation as part of an evolutionary loop to optimize the payment scheduling process. Therefore, the system 100 may provide a genetic algorithm as a computer simulation of Darwinian natural selection that iterates through various generations to converge toward a best solution in the problem space. Further, in reference to mutation, one of the chromosomes may be randomly selected, then a position (i.e., gene) within the selected chromosome may be selected for mutation, and then the value of the randomly selected position (i.e., gene) may be randomly changed or mutated to produce one or more new characteristics that were not previously available.

At 412, the method 400 may be configured to combine and select potential payment schemes (chromosomes) for a next generation until a best potential payment scheme (best chromosome) is not changed any more for generations. In an example, the operations at 410 and 412 may be repeated or cycled until the best potential payment scheme (best chromosome) is achieved for subsequent selection. By using the genetic algorithm, a best reasonable payment scheme may be selected or determined for one or more forthcoming AP payments in a closed circle or loop for each vendor.

At 414, the method 400 may be configured to select a best payment scheme with optimized or maximized discount and maintained cash reserve requirement (i.e., predetermined working capital reserve threshold). By using the genetic algorithm, a best reasonable payment scheme may be selected or determined for one or more forthcoming AP payments for each vendor while considering the optimized or maximized vendor discounts and maintaining cash reserve requirement (i.e., predetermined working capital reserve threshold).

At 416, the method 400 may be configured to transform one or more determined accounts payable (AP) vendors to corresponding fixed payment (FP) vendors for future payment optimization. In an implementation, by using the genetic algorithm, some of the pay dates of the AP vendors may be determined and fixed, to thereby transform the pay dates into fixed payment (FP) for future payment optimization in a next closed circle or loop.

In reference to FIG. 4, pseudo code portions 1 and 2 illustrate an example of the payment optimization process 400 with risk management.

Pseudo Code Portion 1:

```
% RISK MANAGEMENT
    % amountOfRec: the amount of AR
    % amountOfActuralRec: the amount of AR with discount
    % numOfDate: the length of period for payment scheduling
    % daysOfShift: days of receiving payment before or after the due date
    % expectedDaysOfShift: expected days of receiving payment before or after the due date
1.    FUNCTION RISKMANAGEMENT
2.    BEGIN
3.        FOR i :=1 to numOfCustoms
4.            FOR j := 1 to numOfOrders[i]
5.                % Calculate the days of payment before or after the due date
6.                daysOfShift[i,j] = PayDate[i,j]−DueDate[i,j]
7.            END FOR
8.            Calculate the mean and variance value of daysOfShift[i]
9.        END FOR
10.       % Consider the AP scheme under different risk of receiving payment from customs
11.       % N is the risk factor which is a real number defined by the user
12.       expectedDaysOfShift = int (mean + variance*N)
13.       Calculate amountOfActuralRec
14.       CALL PAYMENT OPTIMIZATION
15.       Select the best chromosome as payment scheme for AP
16.       Transform the determined AP into FP for future payment optimization
17.   END
% PAYMENT OPTIMIZATION
    % amountOfRec: the amount of AR
    % amountOfPay: the amount of AP
    % amountOfActuralRec: the amount of AR with discount
    % amountOfActuralPay: the amount of AP order with discount
    % amountOfReserve: amount of cash reserve
    % numOfDate: the length of period for payment scheduling
    % numOfChrom: the number of chromosomes
    % ParentChrom: parent chromosomes
                % ChildChrom: child chromosomes
    % InterChrom: combination of parent chromosomes and child chromosomes
    % ProCro: probability of crossover
    % ProMut: probability of mutation
18.   FUNCTION PAYMENT OPTIMIZATION
19.   BEGIN
20.       Initialize P valid chromosomes
21.       FOR p : = 1 to numOfChrom DO
22.           FOR t := 1 to numOfDate DO
23.               %Calculate AP with discount and penalty
24.               CALL FUNCTION AMOUNTOFAP (Chrom [p], numOfDate, amountOfPay)
25.           END FOR
26.       END FOR
27.       ParentChrom = Chromosomes
28.       WHILE NOT CONVERGED
29.           CALL FUNCTION CrossoverAndMutation(ParentChrom, ProCro, ProMut)
30.           Combine ParentChrom and ChildChrom, which is denoted as InterChrom
31.             %Fitness evaluation
32.             CALL FUNCTION EVALUATE(InterChrom)
33.             Sort InterChrom according to Score
34.             Select the top numOfChrom as ParentChrom for the next generation
35.       END WHILE
36.   END
```

Figure 5:
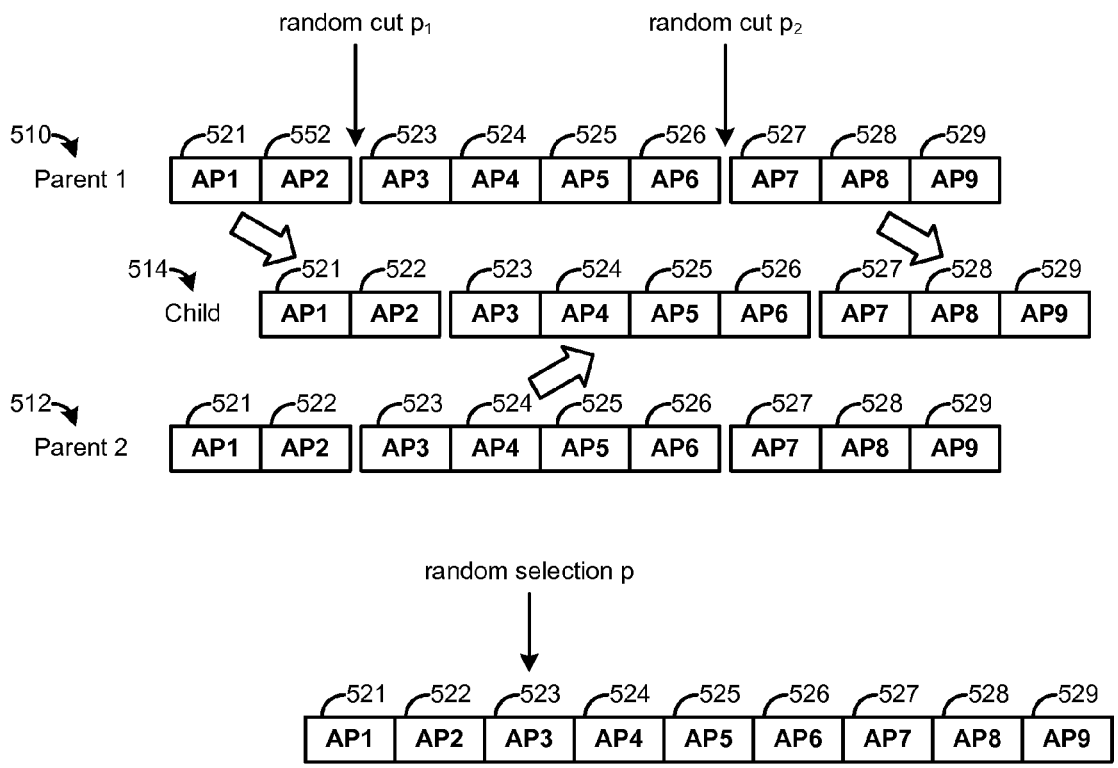
FIG. 5 is a diagram illustrating an example combination of chromosomes.

FIG. 5 is a diagram illustrating an example combination of chromosomes 510, 512, such as payment schedule chromosomes (i.e., potential payment schemes), as described herein. In an example, chromosomes 510, 512 may include a pair of a plurality or population of payment schedule chromosomes determined by chromosome comparator 134, which are output to the chromosome combiner 130, as described herein. Such pairs of chromosomes may be input to the chromosome combiner 130 and then combined in the role of parent chromosomes to execute a simulation of sexual crossover to obtain a new child chromosome 514, which, as described herein, may be part of a new generation of chromosomes that may be input back into the chromosome comparator 134 with other members of the same generation as part of an evolutionary loop to optimize the payment scheduling process. Therefore, the genetic algorithm handler 130 may provide a genetic algorithm as a computer simulation of Darwinian natural selection that iterates through various generations to converge toward a best solution in the problem space.

In the example of FIG. 5, the chromosomes 510-514 are each represented as part of an accounts payable (AP) array of a predetermined size, such as T=9 (e.g., AP1-AP9), within one or more time intervals, such as specific time intervals 521-529 that correspond to each accounts payable gene within each chromosome 510-514. For example, as shown in FIG. 5, each parent chromosome 510, 512 includes a plurality of accounts payable (AP) genes, such as 9 genes including AP1 to AP9. After crossover (e.g., as indicated by the arrows), the child chromosome 514 includes a plurality of AP genes, such as 9 genes including AP1 to AP9, selected from a combination of parent genes from the parent chromosomes 510, 512. As shown in FIG. 5, the combination may be performed after one or more random cuts (e.g., random cuts 1 and 2) applied to the parent chromosomes 510, 512 to generate the child chromosome 514.

In accordance with aspects of the disclosure, the example of FIG. 5 may be directed to the system 100 comparing the payment schedule chromosomes 510, 512 (i.e., potential payment schemes) for each vendor in the specific time intervals 521-529 based on a determined confidence level for each customer, as described herein. The system 100 compares each payment schedule chromosomes 510, 512 relative to a pre-determined working capital reserve threshold, as described herein, to thereby output a selected subset of the payment schedule chromosomes. The system 100 combines the payment schedule chromosomes 510, 512 of the selected subset of payment schedule chromosomes to obtain a next generation (i.e., child chromosome 514) of the payment schedule chromosomes 510, 512 for subsequent comparison therewith of the next generation 514 of payment schedule chromosomes with respect to the predetermined working capital reserve threshold, as part of an evolutionary loop of the payment schedule chromosomes 510, 512. During multiple iterations of next generations, the system 100 monitors the evolutionary loop and selects a selected payment schedule chromosome therefrom for implementation of the payment schedule based thereon.

The example of FIG. 5 illustrates a concept of genetic recombination as executed in the genetic algorithm handler 130. As shown in FIG. 5, a recombination of chromosomes applied to the two parents 510, 512 by the chromosome combiner 136 to produce the new child chromosome 514, using a two-point crossover scheme. Using this approach, a randomly chosen contiguous subsection of the first parent 510 (defined by random cuts 1 and 2) may be copied to the child 514, and then all remaining items in the second parent 512 are added that have not already been taken from the subsection of the first parent 510. The portions of the parent chromosomes 510, 512 defined by the random cuts 1 and 2 are illustrated darker lines and indicated by corresponding arrows as being combined within the child chromosome 514, to thereby maintain the order of appearance as in the parent chromosomes 510, 512.

Such a combination is but one example of various possible recombination techniques. In general, it should be appreciated from known characteristics of genetic algorithms that parent chromosomes may recombine to produce a children chromosome, simulating sexual crossover, and occasionally a mutation may be caused to arise within one of the parent chromosome(s) and/or the child chromosome(s), which may produce new characteristics that were not available. Such mutations may be generated at random, or according to a pre-defined mutation technique, by the chromosome combiner 130. For instance, in reference to the example of FIG. 5, one of the chromosomes may be randomly selected (e.g., parent 1, parent 2, or child), then one position p (i.e., gene) within the selected chromosome may be selected for mutation, and then the value of the randomly selected position p (i.e., gene) may be randomly changed or mutated to produce one or more new characteristics that were not previously available.

The child chromosomes may be passed to the chromosome comparator 134, which, as described herein, may be configured to evaluate and then rank the child chromosomes, and thereafter to select a best subset of the child chromosomes to be the parent chromosomes of the next generation to thereby simulate natural selection. The generational or evolutionary loop may end, e.g., after some optimal condition is met, or after some stopping condition is met. As an example of the latter, the payment optimizer 126 may be configured to monitor the genetic algorithm handler 130 and end the evolutionary loop after any number of generations (e.g., 100) have passed, or until the genetic algorithm handler 130 fails to produce a better solution after a pre-set number of generations. To compare and evaluate chromosomes, the chromosome comparator 134 may implement an evaluation function that considers factors, parameters, preferences, and/or requirements of the system 100. An evaluation function may be applied to obtain a total score(s) for each chromosome that may then be used to select a best subset of child chromosomes to be parent chromosomes of a next generation.

In reference to FIG. 5, pseudo code portion 3 illustrates an example of crossover and mutation for the genetic algorithm.

| Pseudo Code Portion 3: |
| --- |
| % CrossoverAndMutation |
|     % numOfDate: the length of period for payment scheduling |
|     % numOfChildChrom: the number of child chromosome |
| 37.    FUNCTION ChildChrom = CrossoverAndMutation (ParentChrom) |
| 38.    BEGIN |
| 39.      WHILE numOfChildChrom<numOfChrom |
| 40.        IF rand( )<ProCro |
| 41.          Randomly select two parent chromosomes ParentChrom[1] and ParentChrom[2] |
| 42.          Randomly select two position where the crossover will happen, donated by $p_1$ and $p_2$ ($1< p_1< p_2$ <numOfDate) |
| 43.          Swap ParentChrom[1][ $p_1$: $p_2$] and ParentChrom[2][ $p_1$: $p_2$] |
| 44.        END IF |
| 45.        IF rand( )<ProMut |
| 46.          Randomly select one parent chromosome |
| 47.          Randomly select one position p where the mutation will happen |
| 48.          Randomly change the value of selected gene |
| 49.        END IF |
| 50.      END WHILE |
| 51.    END |

Pseudo code portion 4 illustrates an example of determining a payment amount for accounts payable (AP).

| Pseudo Code Portion 4: |
| --- |
| % AMOUNTOFAP |
|     % amountOfPay: the amount of AP order |
|     % amountOfActuralPay: the amount of AP order with discount |
|     % amountOfFP: the amount of fixed payment |
|     % DisLev: levels of discount rate |
|     % numOfDisLev: the number of levels of discount rate |
|     % RateOfDis: the discount rate |
| 52.    FUNCTION amountOfActuralPay = AMOUNTOFAP (Chrom[p], numOfDate, amountOfPay) |

Pseudo Code Portion 4:

```
53.  BEGIN
54.       FOR i := 1 to numOfDate DO
55.            FOR j := 1 to numOfDisLev
56.                 IF Chromosome[i] = DisLev[j]
57.                      amountOfActuralPay[i] =
                           amountOfPay[i]*RateOfDis[j]+amountOfFP[i]
58.                 ENDIF
59.            ENDFOR
60.       ENDFOR
61.  END
```

Pseudo code portion 5 illustrates an example of evaluating an advanced payment for a discount while considering the cash reserve requirement.

Pseudo Code Portion 5:

```
% EVALUATION
     % amountOfDiscount: the total amount of discount
     % amountOfRes: amount of cash reserve
     % amountOfVio: amount of cash less than requirement
     % cashReq: cash requirement
     % w: weight to trade-off between amount of discount
       and cash less than requirement
62.       FUNCTION Score = EVALUATE(InterChrom)
63.       BEGIN
64.            FOR EACH day
65.                 %Calculate the cash reserve each day
66.                 amountOfRes[t] = amountOfRes[t-1]+
                      amountOfActuralRec[t]- amountOfActuralPay[t]
67.                 IF amountOfRes [t] < cashReq
68.                      amountOfVio[t] = cashReq-amountOfRes[t]
69.                 ELSE
70.                      amountOfVio[t]=0
71.                 END IF
72.            END FOR
73.            amountOfDiscount = Σ_tamountOfPay[t] -
                  amountOfActualPay[t]
74.            amountOfVio = Σ_tamountOfVio[t]
75.            Score = amountOfDiscount + w*amountOfVio
76.       END
```

FIG. 6 is a diagram illustrating an example chromosome structure 600, such as a potential payment scheme with a discount rate, as described herein.

The i-th gene in a chromosome represents a different level of a discount rate, $g_i = D_j$, where $D_j$ is an integer number, and j=1, 2, . . . , l, where l is a number of levels of the discount rate. For example, as shown in FIG. 6, when l=5, 2 represents a date of payment 30-day-ahead or earlier, 1 represents a date of payment between 29-days-ahead and 10-day-ahead, 0 represents a date of payment between 9-day-ahead and a due date, −1 represents a date of payment between 1-day-delay and 9-day-delay, and −2 represents a date of payment between 10-day-delay and 29-day delay.

In the example of FIG. 6, in the first 10 days, only 0, −1, and −2 may be valid in the genetic algorithm (GA) coding. From the 11th day to the 30th day, 0, −1, −2, and 1 may be valid. In the remainder part, 0, 1, 2 and −1, −2 may be valid.

In reference to FIG. 6, pseudo code portion 6 illustrates an example of a chromosome structure, such as a potential payment scheme with a discount.

Pseudo Code Portion 6:

```
77.  % Custom Structure
78.  % numOfOrders: the number of orders of this custom owned
79.  Structure Custom
80.  {
81.       int CustomID;
82.       string Name;
83.       Account orders[numOfOrders];
84.       date PayDate[numOFOrders];
85.       double discount[ ];
86.  }
87.  % Account Structure
88.  Structure Account
89.  {
90.       double Amount;
91.       date DueDate;
92.  }
93.  % Chromosome Structure
94.  Structure Chromosome
95.  {
96.       int gene[numOFOrders];
97.  }
```

Figure 7:
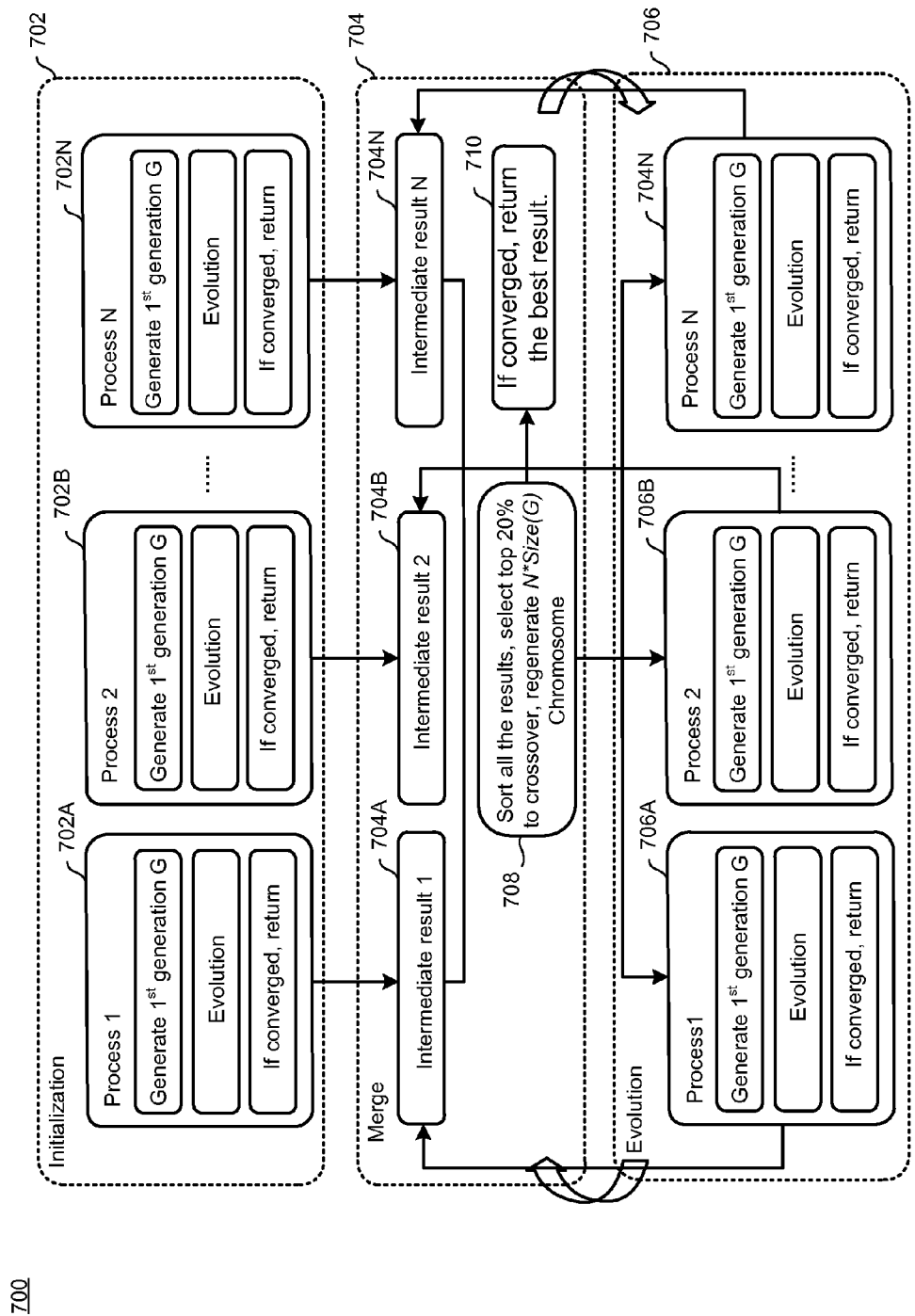
FIG. 7 is a block diagram illustrating an example framework for managing working capital by implementing a genetic algorithm for payment scheduling.

FIG. 7 is a block diagram illustrating an example framework 700 for managing working capital by implementing a genetic algorithm for payment scheduling in a manner consistent with methods provided herein. In an implementation, the framework 700 illustrates a parallel framework in which the various operations of the payment optimizer 126 and the genetic algorithm handler 130 may be parallelized to obtain faster, more efficient results.

In this regard, two, three, or more processors may be utilized to divide tasks of a larger computational task so as to obtain computational results in a faster, more efficient manner. Such parallelization may include division of subtasks to be executed in parallel among a specified number of processors, whereupon independent, parallel processing of the assigned subtasks may proceed, until such time as it may be necessary or desired to rejoin or otherwise combine results of the parallel threads of computation into a unified intermediate or final result for the computational task as a whole.

In this regard, it should be appreciated that such parallelization may be implemented using any multi-computing platform in which a plurality of processors, central processing units (CPUs), or other processing resources are available, including network/device clusters. For example, such parallel processing may utilize existing SMP/CMP (Symmetrical Multi-Processing/Chip-level Multi-Processing) servers. Thus, in the present description, it should be appreciated that the described processes may each be executed using such a corresponding unit(s) of processing power within any such environment in which multiple processing options are available. For example, it may be appreciated that the at least one processor 110 of FIG. 1 may be understood to represent any two or more of the above-referenced implementations for executing parallel processing, or other platforms for parallel processing, as would be apparent.

In the example of FIG. 7, an initialization stage 702 is illustrated in which "N" processes 702A, 702B, . . . 702N are illustrated. As illustrated, each process 702A-702N represents a separate instance of the above-described evolutionary loop of the genetic algorithm handler 130. Specifically, as shown in each of the processes 702A-702N, a generation "G" of chromosomes may be generated, whereupon evolution of subsequent generations of chromosomes may be conducted, until such time as if and when the payment optimizer 126 may identify a desired type and extent of convergence. As may be appreciated, the chromosome generations of the initial processes 702A-702N may be generated in random fashion. In other example implementations, the initial populations may be generated using one or more techniques designed to provide at least a high level of design which attempts to optimize associated schedules, or at least to eliminate inclusion of unworkable or otherwise undesirable potential schedules.

In a subsequent merge stage 704, intermediate results 704A, 704B . . . 704N may be combined, so that, in an operation 708, the combined results may be sorted, and the top 20% (or other designated portion) may be selected for use in creating a subsequent generation of chromosomes. Specifically, the selected portion of a current generation of chromosomes may be utilized to perform the types of crossovers described herein, or other known types of crossovers.

In the example of FIG. 7, individual pairs of chromosomes may be crossed over multiple times, for example, such that a subsequent generation of chromosomes includes N*size (G) chromosomes (i.e., includes a same number of chromosomes as a current generation). For instance, in the example of FIG. 7, since a top 20% of sorted chromosomes may be selected, each pair of chromosomes may be utilized to generate a plurality of new child chromosomes so as to maintain a same number of chromosomes in each generation.

If the overall operation is designated as having converged in conjunction with the operation 708, then the best result (i.e., the chromosome representing the best schedule according to the designated metric of profit maximum and/or utilization maximization) may be returned, as shown in operation 710. Otherwise, an evolution operation 706 may proceed with a re-parallelization of the new, child chromosome population generated in the operation 708.

Specifically, as shown, processes 706A, 706B . . . 706N may execute a new, current iteration of processing of the generated population chromosomes, in a manner that is substantially identical to the processes 702A, 702B . . . 702N with respect to the initialization operations 702. Subsequently, intermediate results 704A, 704B . . . 704N corresponding respectively to the processes 706A, 706B . . . 706N may be merged for subsequent sorting, crossover, and regeneration in the context of the operation 708. As may be appreciated, the operations 702, 704, 706 may proceed until convergence is reached at operation 710, and a best or best available result is obtained.

Figure 8:
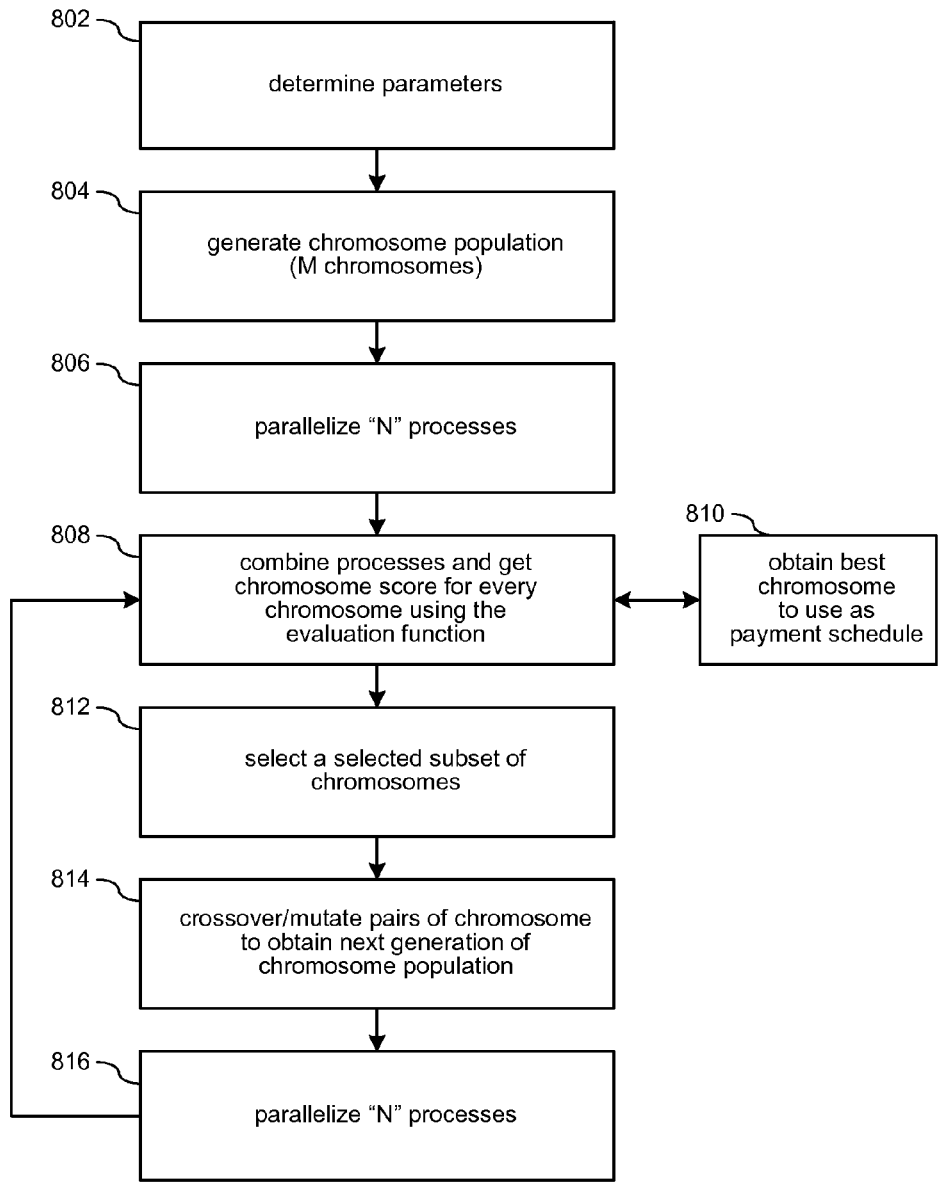
FIG. 8 is a process flow illustrating another example method for managing working capital by implementing a genetic algorithm for payment scheduling.

FIG. 8 is a process flow illustrating another example method 800 for managing working capital by implementing a genetic algorithm for payment scheduling in reference to the operations of the framework 700 of FIG. 7.

At 802, parameters may be determined. For example, parameters that characterize various portions of the chromosomes to be constructed and/or against which viability of the chromosomes may be judged, as well as a preferences received from a user for performing such judgments, (e.g., optimization of AP payment schedules for each vendor within the one or more time intervals based on the determined confidence level (i.e., risk level) for each customer and one or more potential payment schemes for each vendor while maintaining the predetermined working capital reserve threshold) may be determined. For example, as described, a user of the system 100 of FIG. 1 may utilize the GUI 152 to identify, designate, provide, or otherwise determine such information.

At 804, an initial chromosome population of "M" chromosomes may be generated. For example, the chromosome generator 128 may generate the first generation G of the processes 702A, 702B . . . 702N of FIG. 7.

At 806, "N" processes may be parallelized. For example, FIG. 7 illustrates an example of parallelization of "N" processes, e.g., in the initialization stage 702.

At 808, a chromosome score for every chromosome of the generation may be obtained by combining the various processes and using an appropriate evaluation function. For example, the chromosome comparator 134 may utilize such an evaluation function to associate a score with each chromosome of the generation. If convergence is reached according to one or more pre-determined criteria, then a best available payment schedule chromosome may be selected for use. For instance, if a chromosome receives a sufficiently high score, or if overall operations of the method 800 have provided a designated number of generations of chromosomes and/or have taken a designated total amount of time, then convergence may be understood to have occurred.

Otherwise, at 812, a selected subset of chromosomes may be selected. For example, the chromosome comparator 134 may select a top 20% of chromosomes as scored by the evaluation function.

At 814, pairs of the selected chromosomes may be subjected to crossovers and/or mutation to obtain a subsequent generation of chromosomes. For example, the chromosome combiner 136 may implement a type of crossover or combination in a manner as described herein.

At 816, parallelization of a subsequent "N" processes may proceed. For example, the chromosome comparator 134 may parallelize the end processes 706A, 706B . . . 706N as part of the evolution operation 706. In this way, a number of generations of chromosomes may be provided, until a suitable chromosome is obtained at 810.

FIGS. 9-15 show various example screenshots of an implementation of the system and methods of FIGS. 1-8.

Figure 9:
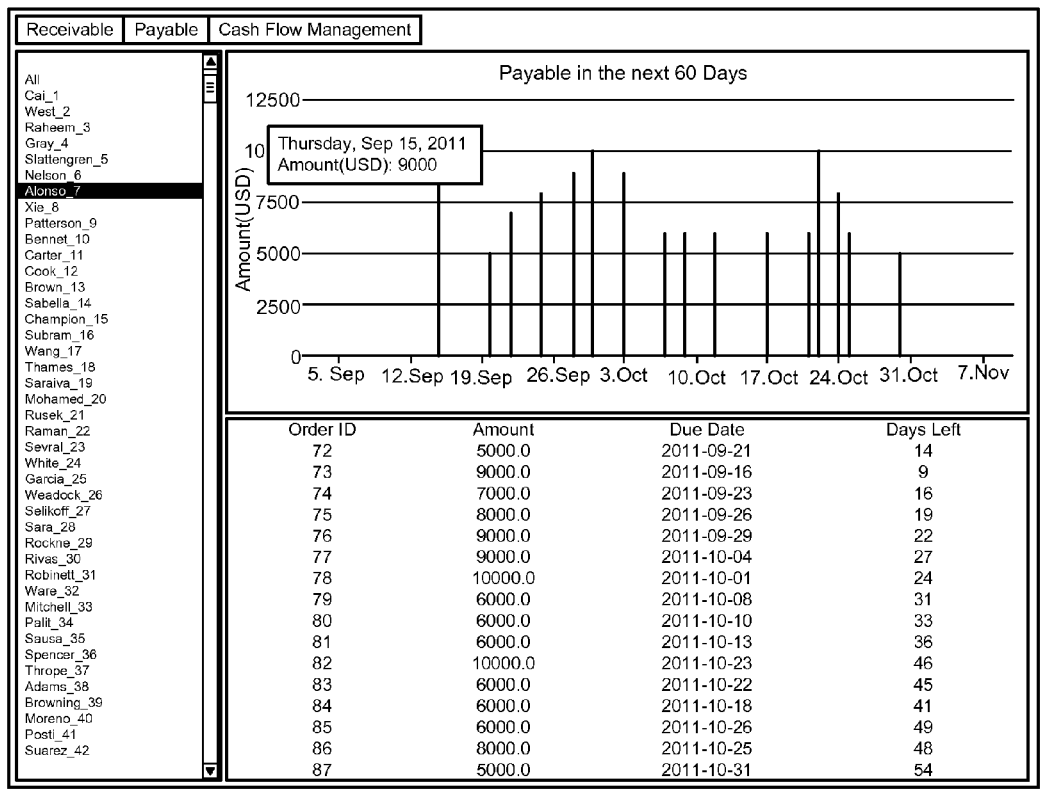
FIGS. 9-15 show various example screenshots of an implementation of the system and methods of FIGS. 1-8.

FIG. 9 shows an example screenshot 900 of a list of accounts payable (AP) sorted by payment due date.

Figure 10:
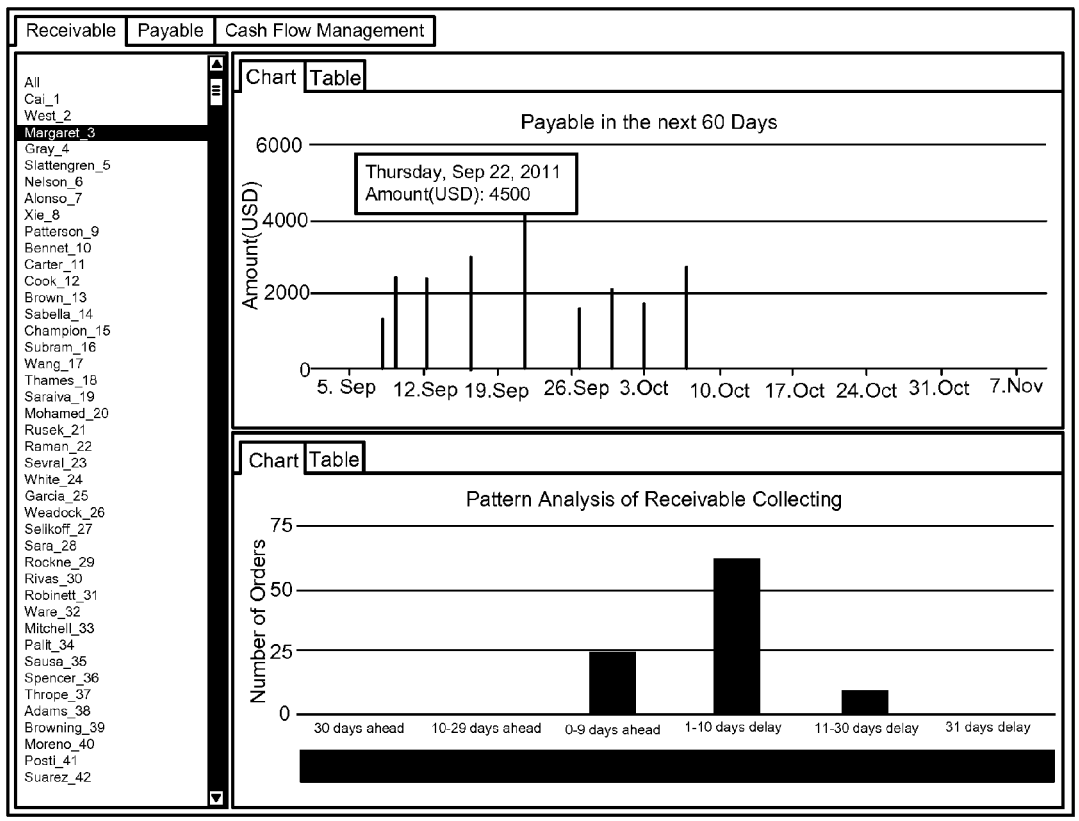

FIG. 10 shows an example screenshot 1000 of a list of customers that have an outstanding balance to pay within the next 60 days. The described systems and methods may be further configured to provide historical data analysis based on an actual payment paid date as well as illustrate the distribution visually.

Figure 11:
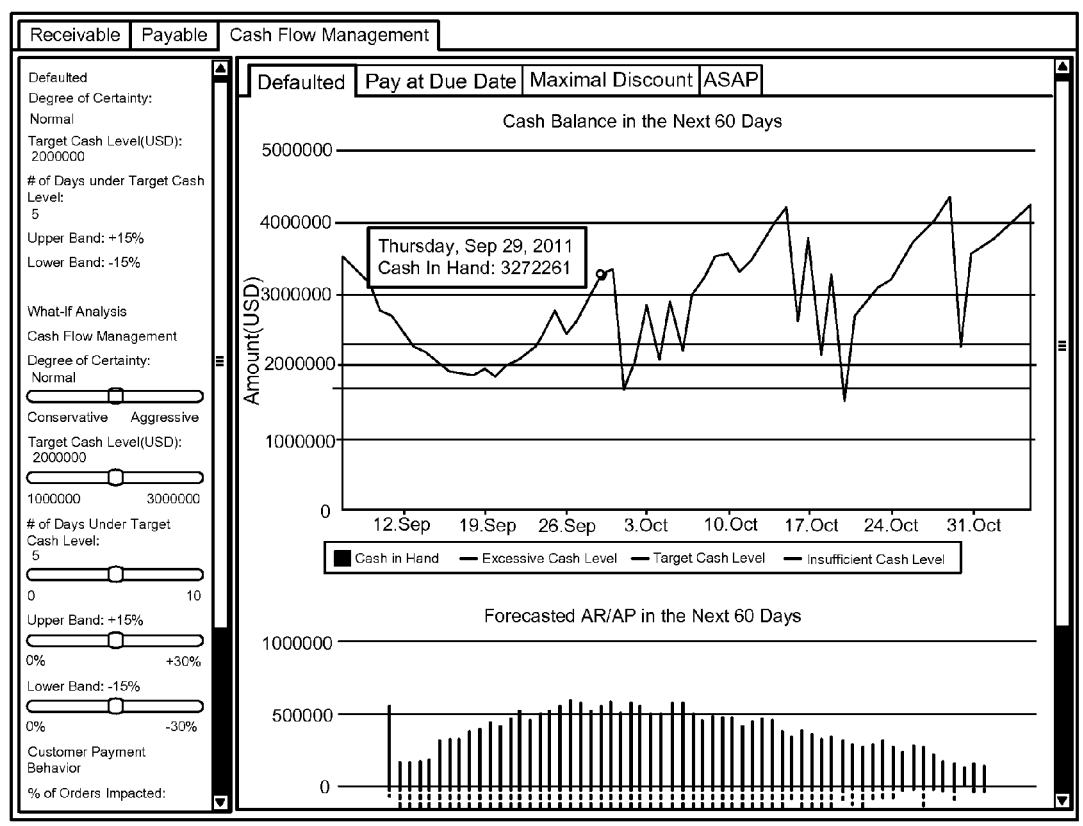

FIG. 11 shows an example screenshot 1100 of a window of cash flow management. In an aspect of the disclosure, the system 100 of FIG. 1 is effective in controlling the cash reserve level (i.e., working capital reserve level) above the target cash reserve level (TCRL) and/or between the target cash reserve level (TCRL) and an insufficient cash level, such as, for example, the low cash reserve level (LCRL), which may be less than 5 days in a month.

Figure 12:
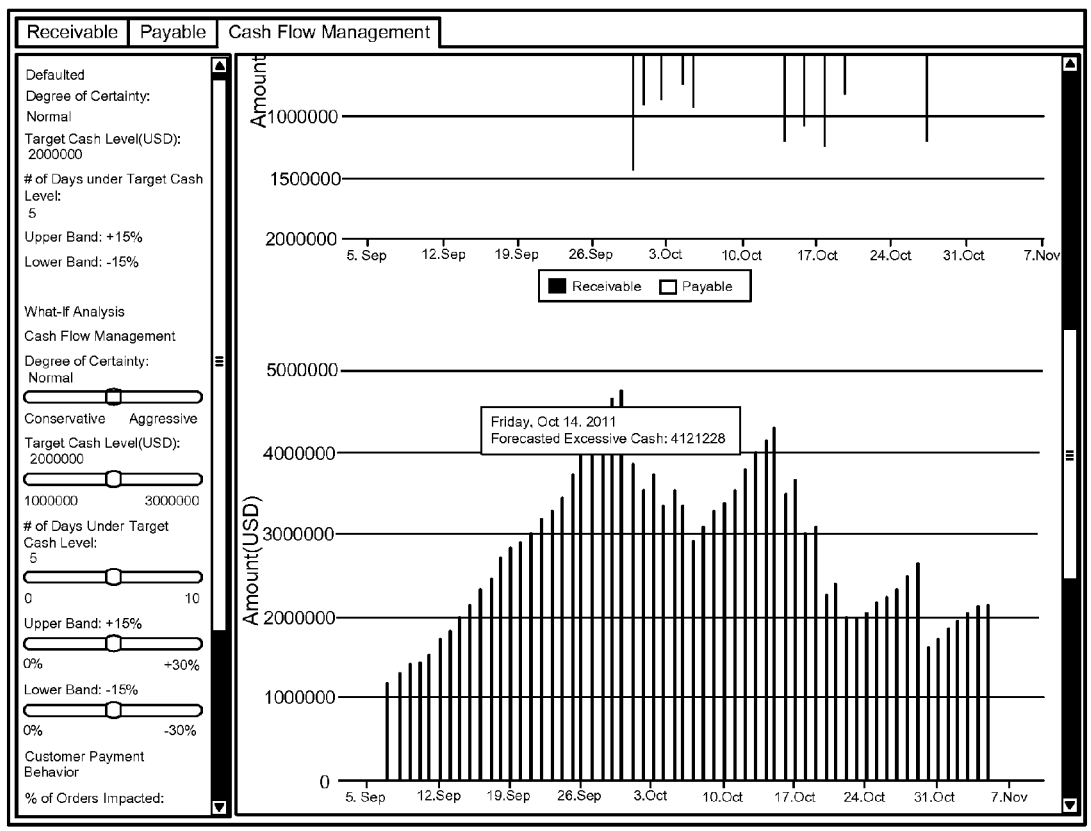

FIG. 12 shows an example screenshot 1200 of a summary of cash flow management results.

Figure 13:
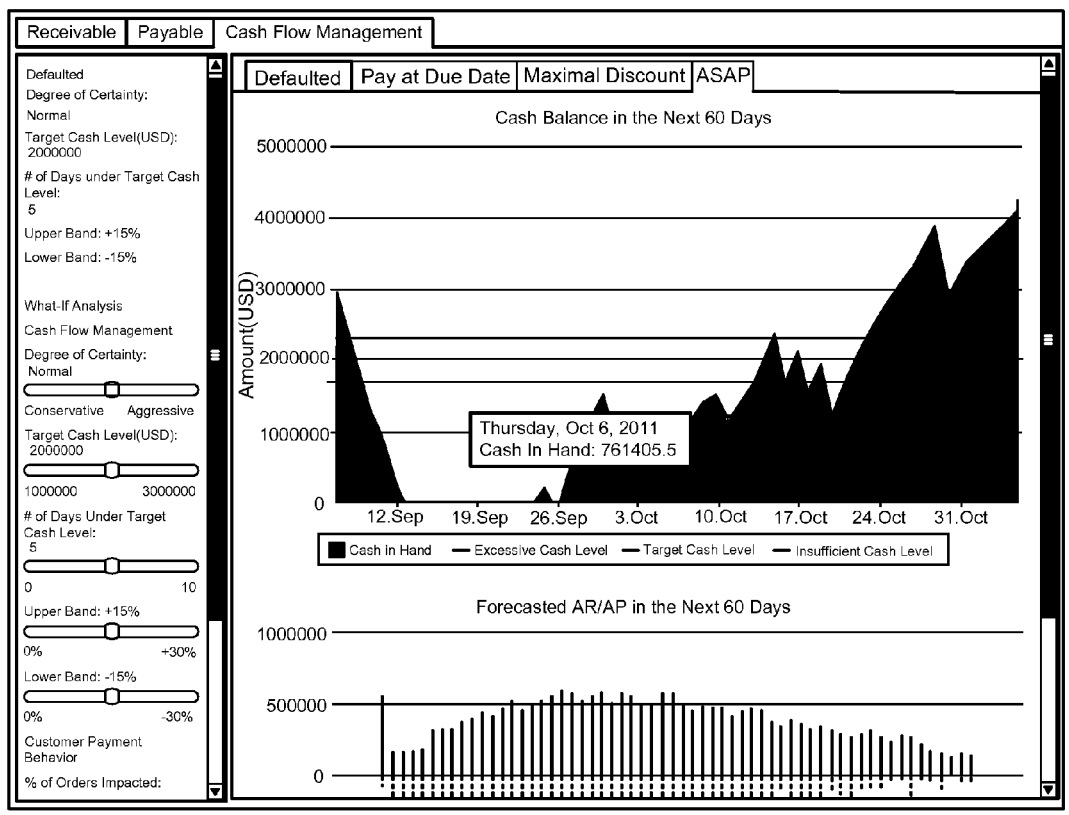

FIG. 13 shows an example screenshot 1300 of cash flow management results of an alternative algorithm (e.g., 'as soon as possible' or ASAP). The algorithm may be configured to pay the accounts payable (AP) as early as there is cash available to do so. As shown, the results are less desirable as the results shown in FIG. 11.

Figure 14:
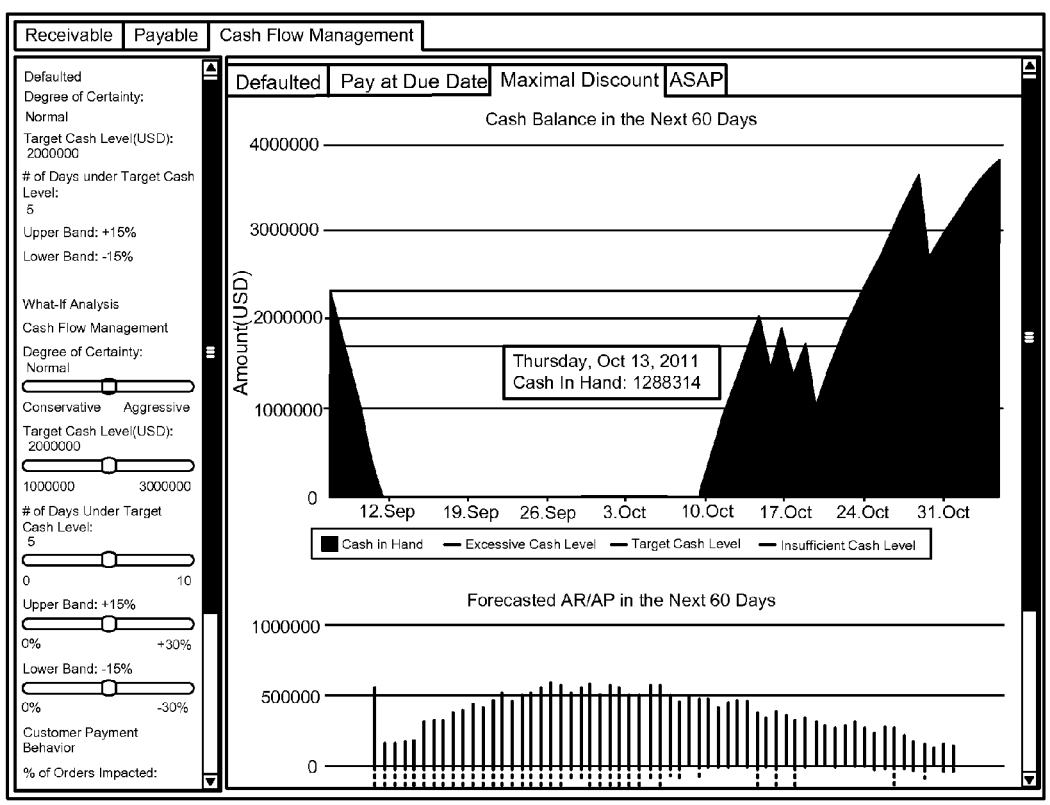

FIG. 14 shows an example screenshot 1400 of cash flow management results of another alternative algorithm (e.g., maximal discount). The algorithm may be configured to pay the accounts payable (AP) as early as possible when an available discount for early payment is allowed by a vendor. As shown, the results are less desirable as the results shown in FIG. 11.

Figure 15:
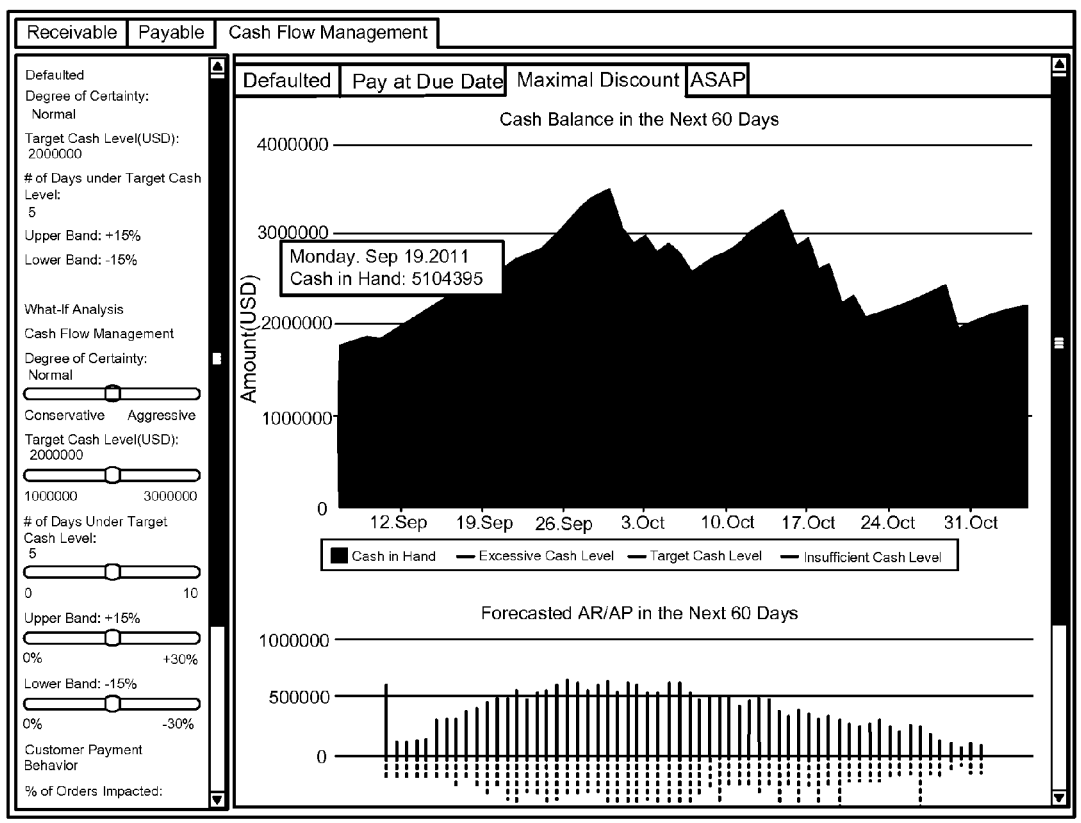

FIG. 15 shows an example screenshot 1500 of cash flow management results of still another alternative algorithm (e.g., paid at the payment due date). The algorithm may be configured to pay the accounts payable (AP) only at the payment due date regardless of any available discount for early payment. As shown, the results are less desirable as the results shown in FIG. 11, since, for instance, the example of FIG. 11 illustrates receipt of sizeable discounts via early payment.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for user interaction, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other types of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of networks, such as communication networks, may include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions recorded on a computer-readable medium and executable by at least one processor, the system comprising:
    a working capital manager configured to cause the at least one processor to schedule payments to be paid for accounts payable based on payments received for accounts receivable relative to one or more time intervals while maintaining a predetermined working capital reserve threshold, wherein the working capital manager includes:
        an account handler configured to retrieve account information for one or more customers from an accounts receivable database and to retrieve account information for one or more vendors from an accounts payable database;
        a risk handler configured to calculate accounts receivable patterns for each customer to determine a confidence level in receiving payments from each customer within the one or more time intervals;
        a genetic algorithm handler configured to generate one or more potential payment schemes for each vendor based on using an advanced payment for a discount and a delayed payment to consider the predetermined working capital reserve threshold; and
        a payment optimizer configured to generate a payment schedule for accounts payable for each vendor within the one or more time intervals based on the determined confidence level for each customer and the one or more potential payment schemes for each vendor while maintaining the predetermined working capital reserve threshold.

2. The system of claim 1, wherein genetic algorithm handler is further configured to:
    generate the one or more potential payment schemes for each vendor based on using a late payment penalty while considering the predetermined working capital reserve threshold.

3. The system of claim 1, wherein the payment optimizer is further configured to:
    evaluate each generated potential payment scheme for each vendor;
    select a best potential payment scheme for each vendor by considering a largest discount while maintaining the predetermined working capital reserve threshold; and
    transform one or more of the accounts payable vendors to a fixed payment vendor for future payment optimization based on the selected best potential payment scheme,
    wherein the fixed payment vendor provides no discount for advanced payment.

4. The system of claim 1, wherein the genetic algorithm handler comprises:
    a chromosome comparator configured to compare a plurality of payment schedule chromosomes, each payment schedule chromosome including the one or more potential payment schemes for each vendor within the one or more time intervals based on the determined confidence level for each customer, and configured to compare each of the plurality of payment schedule chromosomes relative to the predetermined working capital reserve threshold, to thereby output a selected subset of the plurality of payment schedule chromosomes; and a chromosome combiner configured to combine payment schedule chromosomes of the selected subset of the plurality of payment schedule chromosomes to obtain a next generation of payment schedule chromosomes for output to the chromosome comparator and for subsequent comparison therewith of the next generation of payment schedule chromosomes with respect to the predetermined working capital reserve threshold, as part of an evolutionary loop of the plurality of payment schedule chromosomes between the chromosome comparator and the chromosome combiner, wherein the payment optimizer is further configured to monitor the evolutionary loop and select a selected payment schedule chromosome therefrom for implementation of the payment schedule based thereon.

5. The system of claim 4, wherein the chromosome combiner is further configured to combine the payment schedule chromosomes including selecting pairs of payment schedule chromosomes and crossing over portions of each pair of payment schedule chromosomes to obtain a child chromosome of the next generation.

6. The system of claim 4, wherein at least a portion of the evolutionary loop is executed using parallel processes in which each generation of payment schedule chromosomes is divided into sub-groups for parallel processing thereof.

7. The system of claim 4, wherein the payment optimizer is further configured to select the selected payment schedule chromosome after a predetermined number of generations of the evolutionary loop, or after determining that the selected payment schedule chromosome satisfies the predetermined working capital reserve threshold.

8. The system of claim 1, wherein the account handler is further configured to:
obtain a plurality of forthcoming accounts receivable from the retrieved account information for the one or more customers from the accounts receivable database; and
obtain a plurality of forthcoming accounts payable from the retrieved account information for the one or more vendors from the accounts payable database.

9. The system of claim 1, wherein the risk handler is further configured to:
estimate a mean and variance of one or more expected dates for receiving payment from each customer before or after a payment due date according to the calculated accounts receivable patterns of payment selection for each customer; and
determine the one or more expected dates for receiving payment from each customer based on the determined confidence level.

10. The system of claim 1, wherein the working capital reserve threshold comprises a cash reserve threshold that considers one or more of:
a target cash reserve level for indicating when a working capital amount is equal to or at least greater than the target cash reserve level;
a low cash reserve level for indicating when the working capital amount is within a range proximate to the target cash reserve level;
a critical cash reserve level for indicating when the working capital amount is less than the target cash reserve level and considered a critically low level; and
an excessive cash reserve level for indicating when the working capital amount is greater than the target cash reserve level and considered an excessively high level.

11. A computer-implemented method, comprising:
scheduling payments to be paid for accounts payable based on payments received for accounts receivable relative to one or more time intervals while maintaining a predetermined working capital reserve threshold by:
retrieving account information for one or more customers from an accounts receivable database;
calculating accounts receivable patterns for each customer to determine a confidence level in receiving payments from each customer within the one or more time intervals;
retrieving account information for one or more vendors from an accounts payable database;
generating one or more potential payment schemes for each vendor based on using an advanced payment for a discount and a delayed payment to consider the predetermined working capital reserve threshold; and
generating a payment schedule for accounts payable for each vendor within the one or more time intervals based on the determined confidence level for each customer and the one or more potential payment schemes for each vendor while maintaining the predetermined working capital reserve threshold.

12. The method of claim 11, wherein the generating the one or more potential payment schemes further includes generating the one or more potential payment schemes for each vendor based on using a late payment penalty while considering the predetermined working capital reserve threshold.

13. The method of claim 11, further comprising:
evaluating each generated potential payment scheme for each vendor;
selecting a best potential payment scheme for each vendor by considering a largest discount while maintaining the predetermined working capital reserve threshold; and
transforming one or more of the accounts payable vendors to a fixed payment vendor for future payment optimization based on the selected best potential payment scheme,
wherein the fixed payment vendor provides no discount for advanced payment.

14. The method of claim 11, further comprising:
comparing a plurality of payment schedule chromosomes, each payment schedule chromosome including the one or more potential payment schemes for each vendor within the one or more time intervals based on the determined confidence level for each customer;
comparing each of the plurality of payment schedule chromosomes relative to the predetermined working capital reserve threshold, to thereby output a selected subset of the plurality of payment schedule chromosomes;
combining payment schedule chromosomes of the selected subset of the plurality of payment schedule chromosomes to obtain a next generation of payment schedule chromosomes for output to the chromosome comparator and for subsequent comparison therewith of the next generation of payment schedule chromosomes with respect to the predetermined working capital reserve threshold, as part of an evolutionary loop of the plurality of payment schedule chromosomes; and
monitoring the evolutionary loop and selecting a selected payment schedule chromosome therefrom for implementation of the payment schedule based thereon.

15. The method of claim 14, further comprising:
combining the payment schedule chromosomes including selecting pairs of payment schedule chromosomes and crossing over portions of each pair of payment schedule chromosomes to obtain a child chromosome of the next generation.

16. The method of claim 14, further comprising:
executing at least a portion of the evolutionary loop using parallel processes in which each generation of payment schedule chromosomes is divided into sub-groups for parallel processing thereof; and
selecting the selected payment schedule chromosome after a predetermined number of generations of the evolutionary loop, or after determining that the selected payment schedule chromosome satisfies the predetermined working capital reserve threshold.

17. The method of claim 11, further comprising:
estimating a mean and variance of one or more expected dates for receiving payment from each customer before or after a payment due date according to the calculated accounts receivable patterns of payment selection for each customer; and
determining the one or more expected dates for receiving payment from each customer based on the determined confidence level.

18. A computer program product, the computer program product being tangibly embodied on a computer-readable storage medium and comprising instructions that, when executed by at least one processor, are configured to:
schedule payments to be paid for accounts payable based on payments received for accounts receivable relative to one or more time intervals while maintaining a predetermined working capital reserve threshold, wherein the instructions, when executed by the at least one processor, are further configured to:
retrieve account information for one or more customers from an accounts receivable database;
calculate accounts receivable patterns for each customer to determine a confidence level in receiving payments from each customer within the one or more time intervals;
retrieve account information for one or more vendors from an accounts payable database;
generate one or more potential payment schemes for each vendor based on using an advanced payment for a discount and a delayed payment to consider the predetermined working capital reserve threshold; and
generate a payment schedule for accounts payable for each vendor within the one or more time intervals based on the determined confidence level for each customer and the one or more potential payment schemes for each vendor while maintaining the predetermined working capital reserve threshold.

19. The computer program product of claim 18, further comprising instructions that, when executed by the processor, are configured to:
compare a plurality of payment schedule chromosomes, each payment schedule chromosome including the one or more potential payment schemes for each vendor within the one or more time intervals based on the determined confidence level for each customer;
compare each of the plurality of payment schedule chromosomes relative to the predetermined working capital reserve threshold, to thereby output a selected subset of the plurality of payment schedule chromosomes;
combine payment schedule chromosomes of the selected subset of the plurality of payment schedule chromosomes to obtain a next generation of payment schedule chromosomes for output to the chromosome comparator and for subsequent comparison therewith of the next generation of payment schedule chromosomes with respect to the predetermined working capital reserve threshold, as part of an evolutionary loop of the plurality of payment schedule chromosomes; and
monitor the evolutionary loop and selecting a selected payment schedule chromosome therefrom for implementation of the payment schedule based thereon.

20. The computer program product of claim 18, further comprising instructions that, when executed by the processor, are configured to:
estimate a mean and variance of one or more expected dates for receiving payment from each customer before or after a payment due date according to the calculated accounts receivable patterns of payment selection for each customer; and
determine the one or more expected dates for receiving payment from each customer based on the determined confidence level.

* * * * *